United States Patent
Kataoka

(10) Patent No.: US 11,398,249 B2
(45) Date of Patent: Jul. 26, 2022

(54) NONCONTACT COMMUNICATION MEDIUM, MAGNETIC TAPE CARTRIDGE, OPERATION METHOD OF NONCONTACT COMMUNICATION MEDIUM, AND STORAGE MEDIUM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/163,592

(22) Filed: Feb. 1, 2021

(65) Prior Publication Data

US 2021/0241794 A1    Aug. 5, 2021

(30) Foreign Application Priority Data

Feb. 4, 2020  (JP) .............................. JP2020-017416
Dec. 7, 2020  (JP) .............................. JP2020-203015

(51) Int. Cl.
  G11B 5/78     (2006.01)
  G11B 9/12     (2006.01)
  G11B 5/008    (2006.01)
  G06K 7/10     (2006.01)

(52) U.S. Cl.
  CPC ............ *G11B 9/12* (2013.01); *G06K 7/10039* (2013.01); *G06K 7/10217* (2013.01); *G06K 7/10336* (2013.01); *G11B 5/00813* (2013.01)

(58) Field of Classification Search
  None
  See application file for complete search history.

(56) References Cited

U.S. PATENT DOCUMENTS

| 6,571,304 | B1 * | 5/2003 | Basham ................ | G06F 3/0617 360/71 |
| 7,227,721 | B1 * | 6/2007 | Kientz ................ | G11B 23/042 |
| 9,824,720 | B1 * | 11/2017 | Breuer ................ | G11B 23/06 |
| 2001/0040855 | A1 * | 11/2001 | Hiraguchi ............ | G11B 23/40 |
| 2001/0043436 | A1 * | 11/2001 | Onmori .............. | G11B 23/0305 |
| 2001/0054664 | A1 * | 12/2001 | Morita ................ | G11B 23/107 242/348.2 |

(Continued)

FOREIGN PATENT DOCUMENTS

| JP | 2003-068052 A | 3/2003 |
| JP | 2004-039173 A | 2/2004 |

(Continued)

*Primary Examiner* — Peter Vincent Agustin
(74) *Attorney, Agent, or Firm* — Solaris Intellectual Property Group, PLLC

(57) ABSTRACT

A noncontact communication medium includes a coil and a processor mounted on a magnetic tape cartridge. The processor communicates with a communicatee by coupling between the coil and the communicatee by electromagnetic induction through an external magnetic field applied from the communicatee. The communicatee merges a command into the external magnetic field. The processor executes processing corresponding to the command merged into the external magnetic field. The processor changes a response time of the processor in response to the command, according to a characteristic of at least one of the magnetic tape cartridge, the noncontact communication medium, or the communicatee.

17 Claims, 34 Drawing Sheets

(56) References Cited

U.S. PATENT DOCUMENTS

| | | | | |
|---|---|---|---|---|
| 2003/0067703 | A1* | 4/2003 | Holmes | G11B 23/0305 |
| 2004/0012876 | A1* | 1/2004 | Tahara | G11B 15/07 |
| 2004/0037004 | A1* | 2/2004 | Kitahara | G11B 5/78 |
| 2008/0105775 | A1* | 5/2008 | Ashikawa | G11B 23/107 |
| | | | | 242/348 |
| 2021/0241062 | A1* | 8/2021 | Kataoka | G06K 19/0726 |
| 2021/0241794 | A1* | 8/2021 | Kataoka | G11B 23/042 |

FOREIGN PATENT DOCUMENTS

| | | |
|---|---|---|
| JP | 2006-134150 A | 5/2006 |
| JP | 2013-041646 A | 2/2013 |
| WO | 2019/176325 A1 | 9/2019 |
| WO | 2019/198438 A1 | 10/2019 |
| WO | 2019/198527 A1 | 10/2019 |

* cited by examiner

NONCONTACT COMMUNICATION MEDIUM, MAGNETIC TAPE CARTRIDGE, OPERATION METHOD OF NONCONTACT COMMUNICATION MEDIUM, AND STORAGE MEDIUM

CROSS REFERENCE TO RELATED APPLICATIONS

This application claims priority under 35 USC 119 from Japanese Patent Application No. 2020-017416 filed on Feb. 4, 2020, and Japanese Patent Application No. 2020-203015 filed on Dec. 7, 2020, the disclosures of which are incorporated herein by reference in their entireties.

BACKGROUND

1. Technical Field

A technique of the present disclosure relates to a noncontact communication medium, a magnetic tape cartridge, an operation method of a noncontact communication medium, and a storage medium.

2. Related Art

WO2019/198438A discloses a noncontact communication medium comprising a memory unit, a power generation unit, a power monitoring unit, and a capacitance controller. In the noncontact communication medium described in WO2019/198438A, the memory unit stores predetermined management information. The power generation unit has a resonance circuit having an antenna coil and a resonance capacitance unit with a variable capacitance value, and a rectification circuit that rectifies a resonance output of the resonance circuit, and generates power to be supplied to the memory unit. The power monitoring unit has a current adjustment element that is connected in parallel to the rectification circuit with respect to the resonance circuit and has a variable resistance value, a reference voltage generation source that generates a reference voltage, and an operational amplifier that performs control such that the current adjustment element adjusts an output voltage of the rectification circuit to be equal to the reference voltage. The capacitance controller is configured to control the resonance capacitance unit based on an output of the operational amplifier.

WO2019/198527A discloses a noncontact communication medium for a recording medium cartridge. The noncontact communication medium comprises a circuit component, a support substrate, and an antenna coil. In the noncontact communication medium described in WO2019/198527A, the circuit component incorporates a memory unit configured to store management information relating to a recording medium cartridge. The support substrate supports the circuit component. The antenna coil has a coil unit that is electrically connected to the circuit component and is formed on the support substrate, and an inductance value of the coil unit is equal to or greater than 0.3 µH and equal to or less than 2.0 µH.

WO2019/176325A discloses a noncontact communication medium comprising a voltage generation unit, a memory unit, a clock signal generation unit, and a controller. In the noncontact communication medium described in WO2019/176325A, the voltage generation unit has an antenna coil for transmission and reception and receives a signal magnetic field from external equipment to generate power. The memory unit stores one or more circuit parameters set in the voltage generation unit and predetermined management information. The clock signal generation unit is configured to selectively generate clock signals of two or more different frequencies. The controller is configured to select the frequency of the clock signal supplied from the clock signal generation unit to the memory unit.

JP2003-068052A discloses a communication device comprising a communication means and a control means. In the communication device described in JP2003-68052A, the communication means is capable of communication with a memory means, which is provided in a storage medium and has at least a management information storage area in which management information for the management of record and reproduction on the storage medium is stored. The control means executes control such that the communication means writes procedure information describing a procedure to be executed by a required device into a procedure information storage area of the memory means.

JP2004-039173A discloses a data library recognition apparatus recognizing the storage position of data in a library that stores cartridges having recording media that are capable of storage of the data. The data library recognition apparatus described in JP2004-039173A comprises a housing unit for housing the cartridges, a plurality of reception means that are provided in correspondence with the respective housing positions of the cartridges and wirelessly receive recognition information that is sent from the cartridges and recognizes the cartridges or the data, and a recognition means for recognizing the storage position of the data based on the recognition information received by the reception means.

JP2006-134150A discloses a noncontact IC card that receives driving power and executes a command. The noncontact IC card described in JP2006-134150A comprises a determination means for determining power required for the execution of the command, a clock signal generation means for generating a clock signal having a frequency according to a determination result of the determination means, and a command execution means for executing the command at a processing speed according to the frequency of the clock signal generated by the clock signal generation means.

JP2013-041646A discloses a tape drive device for storing data in a tape cartridge that is provided with a magnetic tape and a nonvolatile semiconductor memory. The tape drive device described in JP2013-041646A comprises a comparison unit, a speed determination unit, and a data write-in unit. The comparison unit performs a comparison between a transfer speed of data sent from a host machine to the tape drive device and a speed threshold value. The speed determination unit determines a write-in speed of the tape cartridge based on the speed threshold value. The data write-in unit writes the data in the tape cartridge. In a case where the determined write-in speed is faster than the speed threshold value, the data write-in unit writes the data to the magnetic tape provided in the tape cartridge. In a case where the determined write-in speed is slower than the speed threshold value, the data write-in unit writes subsequent data, which is subsequent to the data written on the magnetic tape, to the nonvolatile semiconductor memory provided in the tape cartridge.

SUMMARY

An embodiment according to the technique of the present disclosure provides a noncontact communication medium, a magnetic tape cartridge, an operation method of a noncontact communication medium, and a program capable of realizing both stabilization of an operation and reduction in power consumption of the noncontact communication medium.

Another embodiment according to the technique of the present disclosure provides a noncontact communication medium, a magnetic tape cartridge, an operation method of a noncontact communication medium, and a storage medium capable of realizing both stabilization of an operation and improvement in a processing speed of the noncontact communication medium.

A first aspect according to the technique of the present disclosure is a noncontact communication medium comprising a power generator that has a coil and generates power with application of an external magnetic field from an outside to the coil, and a processor that operates with the power and executes processing on a command included in the external magnetic field, in which the processor is configured to make a response time, which is needed until the noncontact communication medium starts a response to the command after transmission of the command from the outside to the noncontact communication medium ends, longer than a first predetermined time.

A second aspect according to the technique of the present disclosure is the noncontact communication medium according to the first aspect, in which the processor is configured to make a processing time, which is needed from a start to an end of the processing, longer than a second predetermined time to make the response time longer than the first predetermined time.

A third aspect according to the technique of the present disclosure is the noncontact communication medium according to the second aspect further comprising a clock signal generator that generates a clock signal using the power, in which the processor is configured to execute the processing at a processing speed according to a frequency of the clock signal, and maintain the frequency regardless of the processing time or make the frequency lower as the processing time is made to be longer.

A fourth aspect according to the technique of the present disclosure is the noncontact communication medium according to any one of the first aspect to the third aspect, in which the command is one command.

A fifth aspect according to the technique of the present disclosure is the noncontact communication medium according to any one of the first aspect to the fourth aspect, in which the coil transmits a processing result of the processing executed by the processor through the external magnetic field.

A sixth aspect according to the technique of the present disclosure is the noncontact communication medium according to any one of the first aspect to the fifth aspect, in which the processor is configured to change the response time according to intensity of the external magnetic field.

A seventh aspect according to the technique of the present disclosure is the noncontact communication medium according to the sixth aspect, in which the processor is configured to, in a case of changing the response time according to the intensity of the external magnetic field, make the response time longer on a condition that the intensity of the external magnetic field falls below a threshold value.

An eighth aspect according to the technique of the present disclosure is the noncontact communication medium according to any one of the first aspect to the seventh aspect, in which the processor is configured to change the response time according to a type of the command.

A ninth aspect according to the technique of the present disclosure is the noncontact communication medium according to the eighth aspect further comprising a first memory that stores information, in which the command is a polling command, a read-out command, or a write-in command, and the processor is configured to execute polling processing according to the polling command, execute read-out processing relating to the information on the first memory according to the read-out command, execute write-in processing relating to the information on the first memory according to the write-in command, and make a time, which is needed for at least the read-out processing between the write-in processing and the read-out processing, longer than a time needed for the polling processing.

A tenth aspect according to the technique of the present disclosure is a magnetic tape cartridge comprising the noncontact communication medium according to any one of the first aspect to the ninth aspect, and a magnetic tape, in which the noncontact communication medium has a second memory, and the second memory stores information relating to the magnetic tape.

An eleventh aspect according to the technique of the present disclosure is an operation method of a noncontact communication medium including a power generator that has a coil and generates power with application of an external magnetic field from an outside to the coil, and a processor that operates with the power and executes processing on a command included in the external magnetic field. The operation method comprises making a response time, which is needed until the noncontact communication medium starts a response to the command after transmission of the command from the outside to the noncontact communication medium ends, longer than a first predetermined time.

A twelfth aspect according to the technique of the present disclosure is a program that causes a computer, which is applied to a noncontact communication medium including a power generator that has a coil and generates power with application of an external magnetic field from an outside to the coil, and a processor that operates with the power and executes processing on a command included in the external magnetic field, to execute processing comprising making a response time, which is needed until the noncontact communication medium starts a response to the command after transmission of the command from the outside to the noncontact communication medium ends, longer than a first predetermined time.

A thirteenth aspect according to the technique of the present disclosure is a noncontact communication medium including a coil and a processor mounted on a magnetic tape cartridge. The processor communicates with a communicatee by coupling between the coil and the communicatee by electromagnetic induction through an external magnetic field applied from the communicatee. The communicatee merges a command into the external magnetic field. The processor executing processing corresponding to the command merged into the external magnetic field. In the noncontact communication medium, the processor changes a response time of the processor in response to the command, according to a characteristic of at least one of the magnetic tape cartridge, the noncontact communication medium, or the communicatee.

A fourteenth aspect according to the technique of the present disclosure is the noncontact communication medium according to the thirteenth aspect, further including a first memory storing first information. The processor executes at least one of reading or writing of the first information from and into the first memory. In the noncontact communication medium, the processor changes the response time according to an available storage capacity set in the first memory.

A fifteenth aspect according to the technique of the present disclosure is the noncontact communication medium according to the thirteenth aspect of the fourteenth aspect, in which the noncontact communication medium is in conformity with a plurality of communication standards. The processor carries out communication with the selective use of the plurality of communication standards. The processor changes the response time according to one of the plurality of communication standards used in the communication.

A sixteenth aspect according to the technique of the present disclosure is the noncontact communication medium according to any one of the thirteenth aspect to the fifteenth aspect, in which the communicatee is able to carry out communication by each of a plurality of communication standards. The processor changes the response time according to one of the plurality of communication standards to which the noncontact communication medium conforms.

A seventeenth aspect according to the technique of the present disclosure is the noncontact communication medium according to any one of the thirteenth aspect to the fifteenth aspect, in which the communicatee is any of a plurality of communication devices. The plurality of communication devices has any of a plurality of communication standards. The processor changes the response time according to one of the plurality of communication standards used by the communicatee.

An eighteenth aspect according to the technique of the present disclosure is the noncontact communication medium according to any one of the thirteenth aspect to the seventeenth aspect, further including a power generator that generates power with application of the external magnetic field to the coil. In the noncontact communication medium, the processor operates with the power, and makes the response time longer than a first predetermined time according to the characteristic.

A nineteenth aspect according to the technique of the present disclosure is the noncontact communication medium according to the eighteenth aspect, in which the processor makes the response time longer than the first predetermined time, by making a processing time required from a start of the processing to an end of the processing longer than a second predetermined time.

A twentieth aspect according to the technique of the present disclosure is the noncontact communication medium according to the nineteenth aspect, further including a clock signal generator that generates a clock signal using the power. In the noncontact communication medium, the processor executes the processing at a processing speed corresponding to a frequency of the clock signal. The processor maintains the frequency regardless of the processing time, or lowers the frequency as the processing time is made longer.

A twenty-first aspect according to the technique of the present disclosure is the noncontact communication medium according to any one of the thirteenth aspect to the twentieth aspect, in which the command is one command.

A twenty-second aspect according to the technique of the present disclosure is the noncontact communication medium according to any one of the thirteenth aspect to the twenty-first aspect, in which the coil transmits a processing result of the processing executed by the processor through the external magnetic field.

A twenty-third aspect according to the technique of the present disclosure is the noncontact communication medium according to any one of the thirteenth aspect to the twenty-second aspect, in which the processor further changes the response time according to the intensity of the external magnetic field.

A twenty-fourth aspect according to the technique of the present disclosure is the noncontact communication medium according to the twenty-third aspect, in which in the case of changing the response time according to the intensity of the external magnetic field, the processor makes the response time longer on a condition that the intensity of the external magnetic field falls below a threshold value.

A twenty-fifth aspect according to the technique of the present disclosure is the noncontact communication medium according to any one of the thirteenth aspect to the twenty-fourth aspect, in which the processor changes the response time according to the type of the command.

A twenty-sixth aspect according to the technique of the present disclosure is the noncontact communication medium according to the twenty-fifth aspect, further including a second memory storing second information. In the noncontact communication medium, the command is a polling command, a read-out command, or a write-in command. The processor executes polling processing according to the polling command, executes read-out processing relating to the second information on the second memory according to the read-out command, and executes write-in processing relating to the second information on the second memory according to the write-in command. The processor makes a time required for at least the read-out processing out of the write-in processing and the read-out processing longer than a time required for the polling processing.

A twenty-seventh aspect according to the technique of the present disclosure is a magnetic tape cartridge including the noncontact communication medium according to any one of the thirteenth aspect to the twenty-sixth aspect, and a magnetic tape. In the magnetic tape cartridge, the noncontact communication medium has a third memory, and the third memory stores information relating to the magnetic tape.

A twenty-eighth aspect according to the technique of the present disclosure is an operation method of a noncontact communication medium including a coil and a processor, which is mounted on a magnetic tape cartridge and communicates with a communicatee by coupling between the coil and the communicatee by electromagnetic induction through an external magnetic field applied from the communicatee. The communicatee merges a command into the external magnetic field. The processor executes processing corresponding to the command merged into the external magnetic field. The operation method includes changing a response time of the processor in response to the command, according to a characteristic of at least one of the magnetic tape cartridge, the noncontact communication medium, or the communicatee.

A twenty-ninth aspect according to the technique of the present disclosure is a storage medium storing a program for a computer applied to a noncontact communication medium. The noncontact communication medium includes a coil and a processor, which is mounted on a magnetic tape cartridge and communicates with a communicatee by coupling between the coil and the communicatee by electromagnetic induction through an external magnetic field applied from the communicatee. The communicatee merges a command into the external magnetic field. The processor executes processing corresponding to the command merged into the external magnetic field. The program causes the computer to execute processing that includes changing a response time of the processor in response to the command, according to the characteristic of at least one of the magnetic tape cartridge, the noncontact communication medium, or the communicatee.

BRIEF DESCRIPTION OF THE DRAWINGS

Exemplary embodiments of the present invention will be described in detail based on the following figures, wherein.

DETAILED DESCRIPTION

Figure 1:
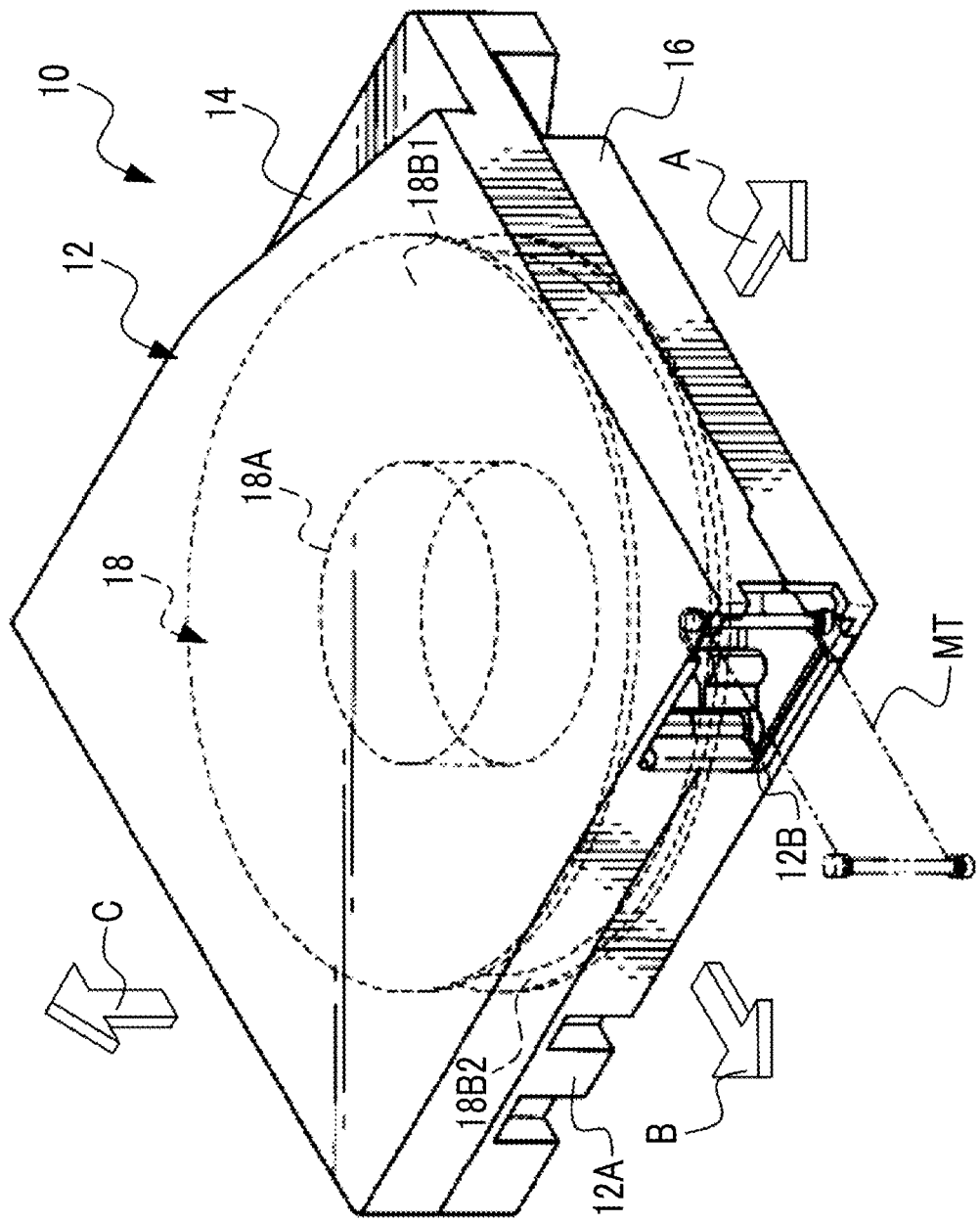
FIG. 1 is a schematic perspective view showing an example of the appearance of a magnetic tape cartridge according to a first embodiment.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RF ID is an abbreviation for "Radio Frequency IDentifier". LTO is an abbreviation for "Linear Tape-Open".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

In the following description, LTO will be described as an example of the specifications of the magnetic tape cartridge 10. In the following description, although description will be provided on an assumption that the specification shown in Table 1 described below is applied to LTO according to the technique of the present disclosure, this is just an example, and the magnetic tape cartridge 10 may be in inconformity with the specifications of magnetic tape cartridges of IBM3592.

TABLE 1

| Communication Command Classification | ISO 14443 Standard | LTO Specification | Technique of Present Disclosure |
|---|---|---|---|
| REQA to SELECT Series | 86 or 91 µs | 86 or 91 µs ("1172/13.56 (MHz)" or "1236/13.56 (MHz)") | Range greater than 86 or 91 µs |
| READ Series | Un-specified | 86 or 91 µs ("1172/13.56 (MHz)" or "1236/13.56 (MHz)") | Range greater than 86 or 92 µs |
| WRITE Series | Un-specified | about 10.02 ms ("135828/13.56 (MHz)" or "135892/13.56 (MHz)") | Range greater than 10.02 ms |

In Table 1, "REQA to SELECT Series" means a polling command described below. In "REQA to SELECT Series", at least a "Request A" command, a "Request SN" command, and a "Select" command are included. "Request A" is a command that inquires a cartridge memory about what type of cartridge memory is. In the embodiment, "Request A" is of one type; however, the technique of the present disclosure is not limited thereto, and "Request A" may be of a plurality of types. "Request SN" is a command that inquires the cartridge memory about a serial number. "Select" is a command that notifies the cartridge memory beforehand of preparation of reading and writing. READ Series is a command corresponding to a read-out command described below. WRITE Series is a command corresponding to a write-in command described below.

First Embodiment

As an example, as shown in FIG. 1, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used. The magnetic tape cartridge 10 is an example of a "magnetic tape cartridge" according to the technique of the present disclosure.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be integrally molded. The magnetic tape MT is an example of a "magnetic tape" according to the technique of the present disclosure.

An opening 12B is formed on a front side of a right wall 12A of the case 12. The magnetic tape MT is pulled out from the opening 12B.

Figure 2:
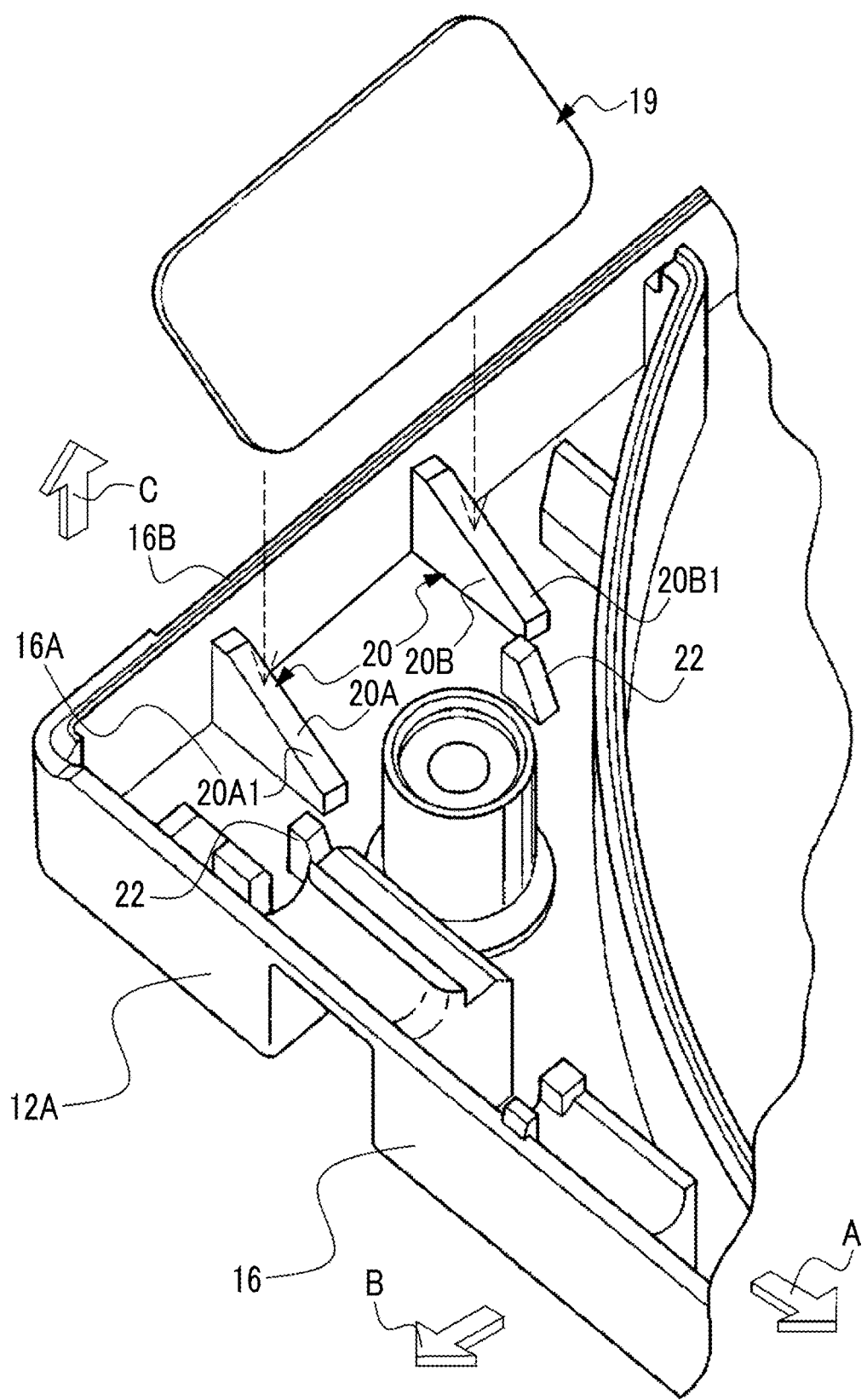
FIG. 2 is a schematic perspective view showing an example of the structure of a rear right end portion inside a lower case of the magnetic tape cartridge according to the first embodiment.

As an example, as shown in FIG. 2, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

In the cartridge memory 19, management information 100 (see FIG. 10) is stored. The management information 100 is information for managing the magnetic tape cartridge 10. Examples of the management information 100 include identification information capable of specifying the magnetic tape cartridge 10, a recording capacity of the magnetic tape MT, the outline of information (hereinafter, referred to as "recorded information") recorded on the magnetic tape MT, items of the recorded information, information indicating a recording format of the recorded information, and the like. The management information 100 is an example of "first information", "second information", and "information relating to a magnetic tape" according to the technique of the present disclosure.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external device performs reading and writing of various types of information from and to the cartridge memory 19 in a noncontact manner. Although details will be described below, the cartridge memory 19 generates power with electromagnetic application to a magnetic field from the external device. Then, the cartridge memory 19 operates using the generated power and performs transfer of various types of information with the external device by performing communication with the external device through the magnetic field. A communication method used therein may be in conformity with publicly known standards e.g. ISO14443, ISO18092, or the like, in conformity with LTO standards of ECMA319, or the like.

As an example, as shown in FIG. 2, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. An inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
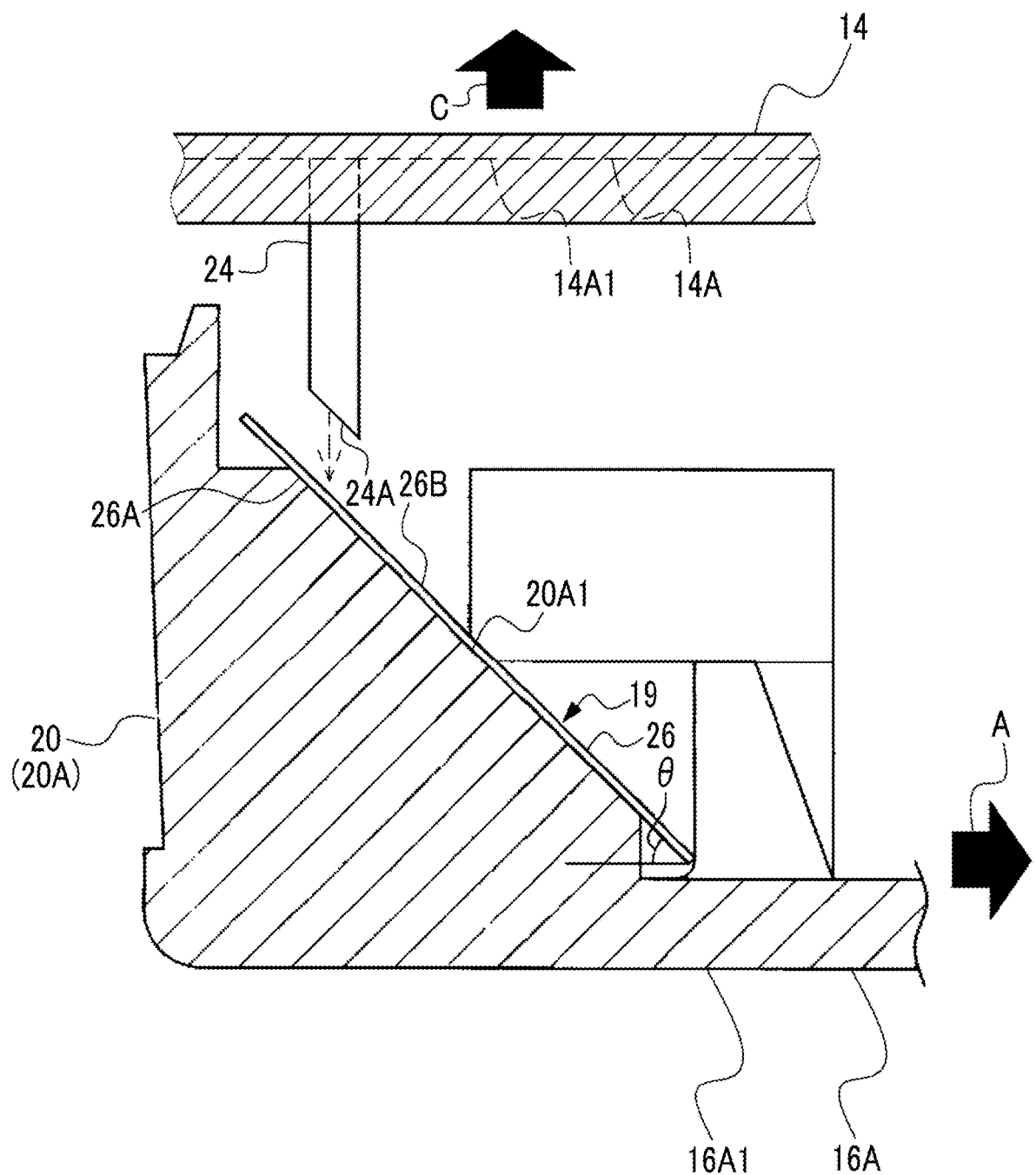
FIG. 3 is a side cross-sectional view showing an example of a support member provided on an inner surface of the lower case of the magnetic tape cartridge according to the first embodiment.

As an example, as shown in FIG. 3, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. An inclination angle θ of the support member 20, that is, an inclination angle of each of the inclined surface 20A1 and the inclined surface 20B1 is 45 degrees with respect to the reference surface 16A1. Note that, 45 degrees are just an example, and the inclination angle θ may satisfy an inequality of "0 degree<inclination angle θ<45 degrees" or may be greater than 45 degrees.

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1, and a front surface 26B of the substrate 26 is exposed to an inner surface 14A1 side of a top plate 14A.

The upper case 14 comprises a plurality of ribs 24. The plurality of ribs 24 are disposed at intervals in the right-left direction of the case 12. The plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1. That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surface of the support member 20. Thus, a position in an up-down direction of the cartridge memory 19 is restricted by the ribs 24.

Figure 4:
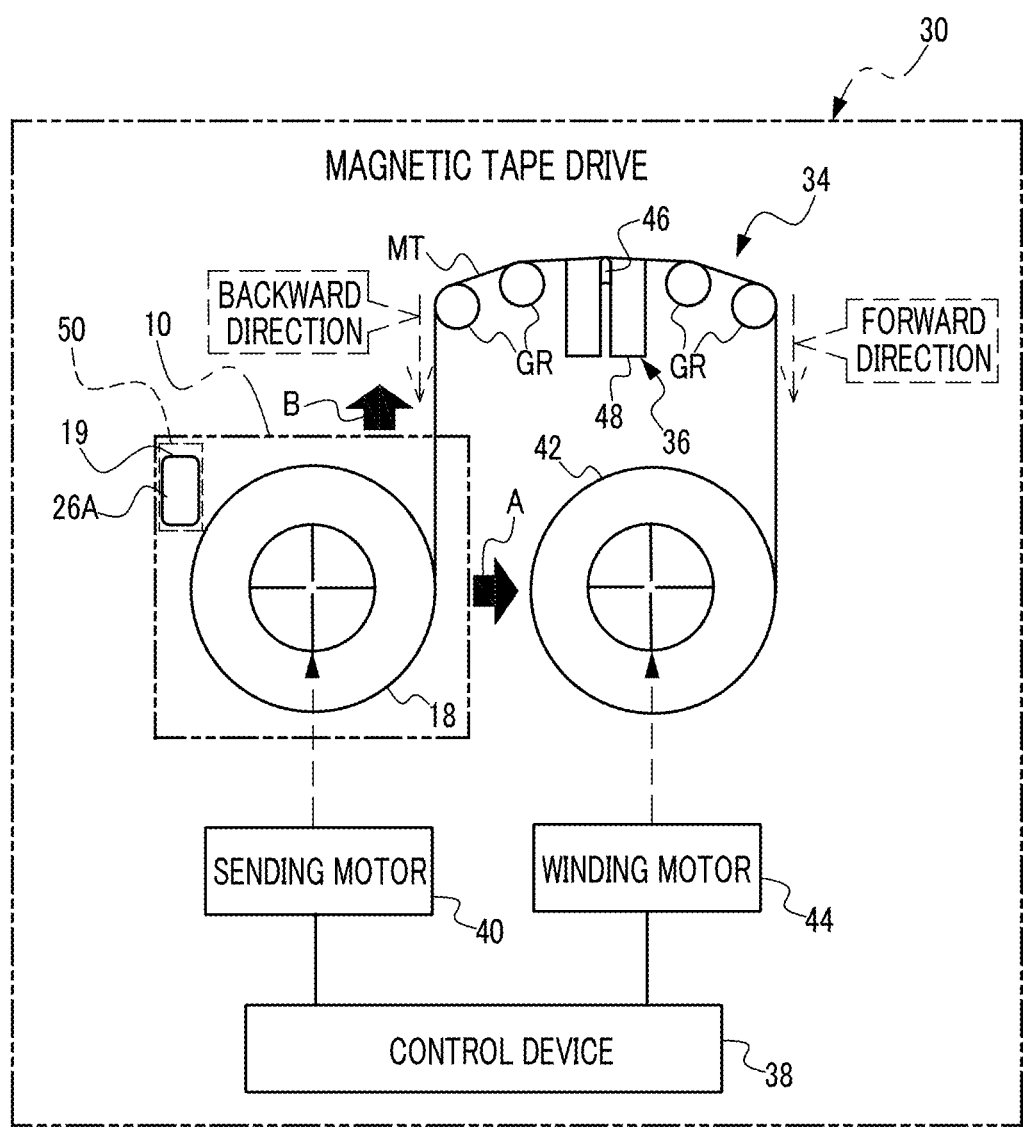
FIG. 4 is a schematic configuration diagram showing an example of the hardware configuration of the magnetic tape drive according to the first embodiment.

As an example, as shown in FIG. 4, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear serpentine method. In the embodiment, in order words, reading of the recorded information indicates reproduction of the recorded information.

The control device 38 controls the entire magnetic tape drive 30. In the embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an AISC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. A rotation speed, a rotation torque, and the like of the sending motor 40 and the winding motor 44 are adjusted according to the speed of the magnetic tape MT wound around the winding reel 42.

In a case where the magnetic tape MT is wound back around the cartridge reel 18, the sending motor 40 and the winding motor 44 are rotated by the control device 38 such that the magnetic tape MT runs in the backward direction. A rotation speed, a rotation torque, and the like of the sending motor 40 and the winding motor 44 are adjusted according to a speed of the magnetic tape MT wound around the cartridge reel 18.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from at least one of a computer simulation, a test with a real machine, or the like as a range of tension in which data can be read from the magnetic tape MT by the reading head 36.

In the embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 so as to contact the magnetic tape MT during running, and reads recorded information from the magnetic tape MT transported by the transport device 34.

The magnetic tape drive 30 comprises the noncontact reading and writing device 50. The noncontact reading and writing device 50 is an example of a "communicatee" an "outside" and a "communication device" according to the technique of the present disclosure. The noncontact reading and writing device 50 is disposed opposite the back surface 26A of the cartridge memory 19 below the magnetic tape cartridge 10 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of the recorded information from the magnetic tape MT by the reading head 36 starts.

Figure 5:
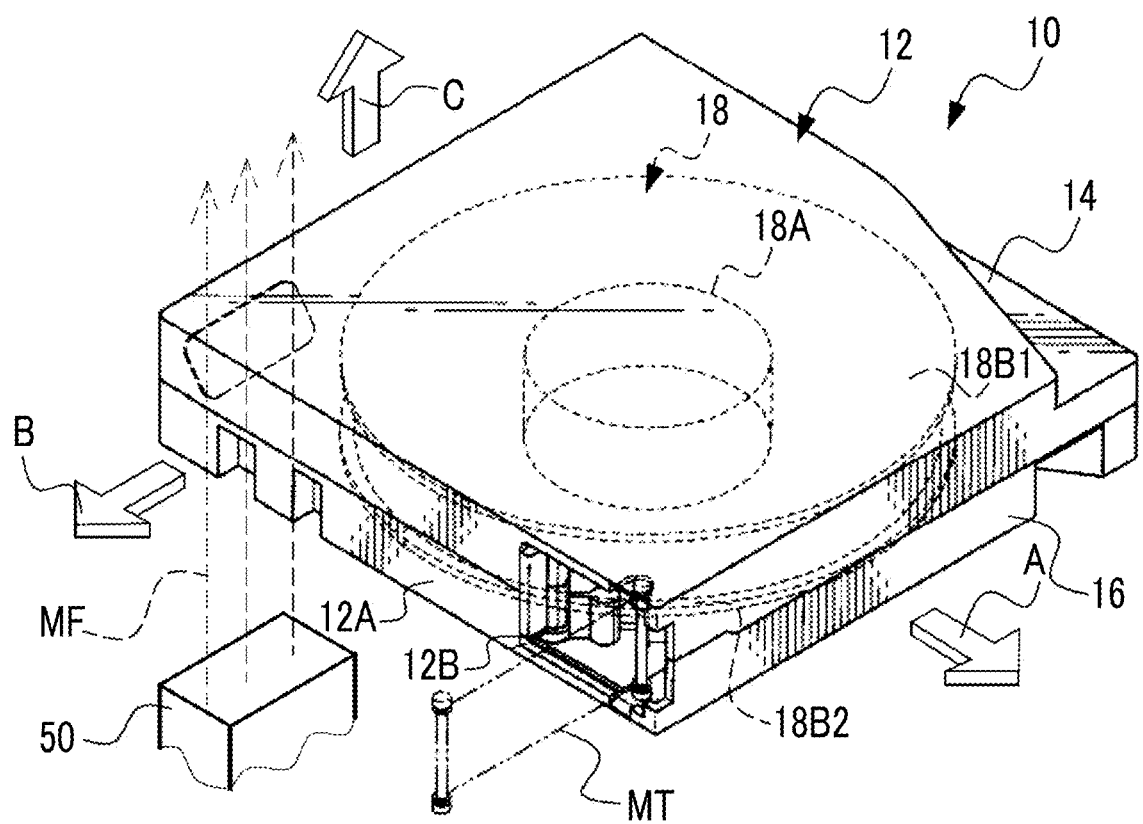
FIG. 5 is a schematic perspective view showing an example of an aspect in which a magnetic field is discharged from a lower side of the magnetic tape cartridge according to the first embodiment by a noncontact reading and writing device.

As an example, as shown in FIG. 5, the noncontact reading and writing device 50 emits a magnetic field MF from the lower side of the magnetic tape cartridge 10 toward the cartridge memory 19. The magnetic field MF passes through the cartridge memory 19. The magnetic field MF is an example of an "external magnetic field" according to the technique of the present disclosure.

Figure 6:
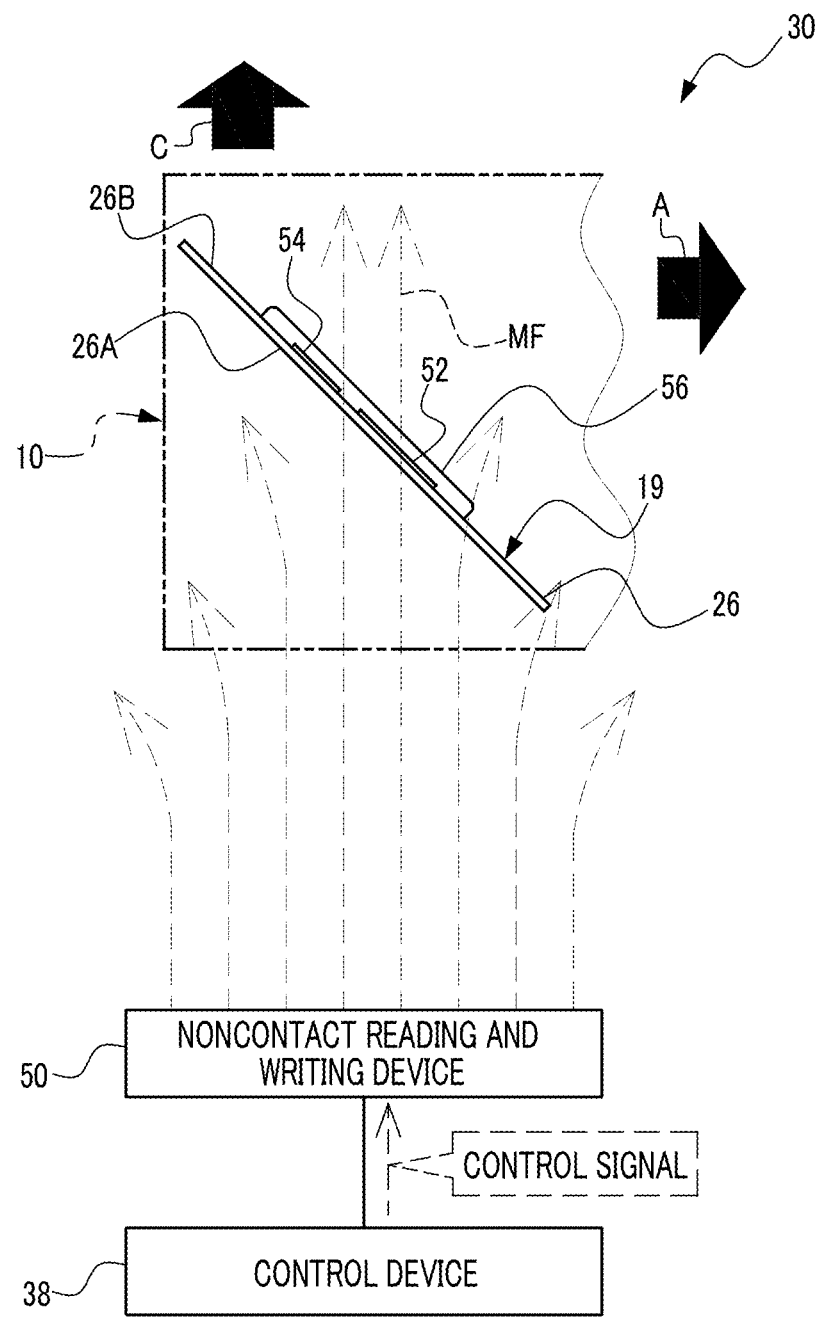
FIG. 6 is a conceptual diagram showing an example of an aspect in which a magnetic field is applied from the noncontact reading and writing device to a cartridge memory in the magnetic tape cartridge according to the first embodiment.

As an example, as shown in FIG. 6, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in accordance with the control signal inputted from the control device 38. The magnetic field MF passes through the cartridge memory 19 from the back surface 26A side to the front surface 26B side.

The noncontact reading and writing device 50 spatially transmits a command signal to the cartridge memory 19 under the control of the control device 38. Though described below in detail, the command signal is a signal indicating a command to the cartridge memory 19. In a case where the command signal is spatially transmitted from the noncontact reading and writing device 50 to the cartridge memory 19, the command signal is included in the magnetic field MF in accordance with an instruction from the control device 38 by the noncontact reading and writing device 50. In other words, the command signal is superimposed on the magnetic field MF. That is, the noncontact reading and writing device 50 transmits the command signal to the cartridge memory 19 through the magnetic field MF under the control of the control device 38. The command signal is an example of a "command" according to the technique of the present disclosure.

An IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, an ultraviolet curable resin that is cured by ultraviolet rays is employed. The ultraviolet curable resin is merely an example, and a photocurable resin that is cured by light in a wavelength range other than the wavelength range of ultraviolet rays may be used as the sealing material 56, a thermosetting resin may be used as the sealing material 56, or an adhesive may be used as the sealing material 56.

Figure 7:
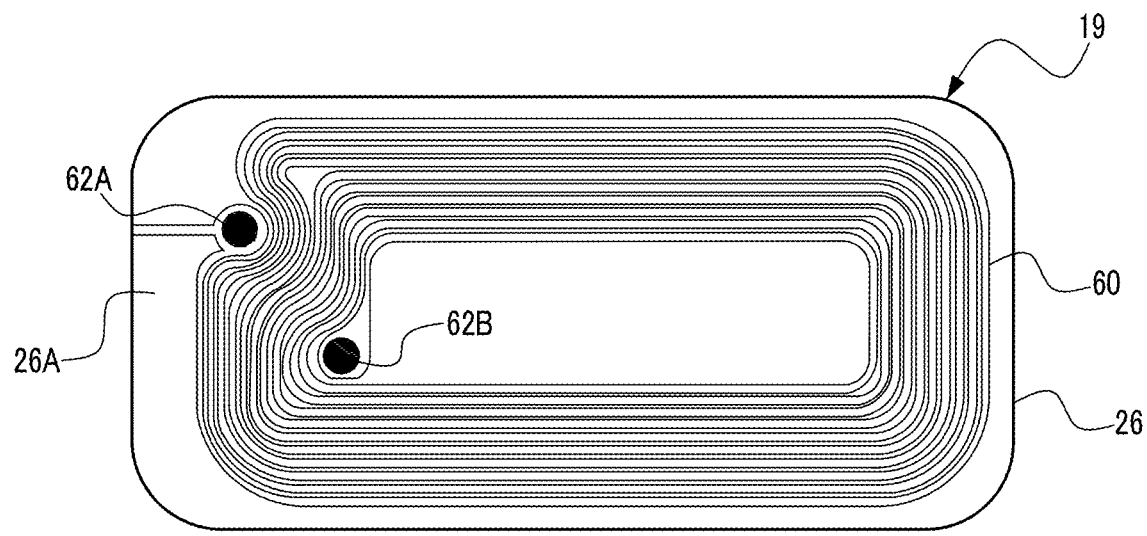
FIG. 7 is a schematic bottom view showing an example of the structure of a back surface of a substrate of the cartridge memory in the magnetic tape cartridge according to the first embodiment.

As an example, as shown in FIG. 7, a coil 60 is formed in a loop shape on the back surface 26A of the cartridge memory 19. Here, as a material of the coil 60, copper foil is employed. The copper foil is merely an example, and for example, another type of conductive material, such as aluminum foil, may be used. The coil 60 induces an induced current with application of the magnetic field MF (see FIGS. 5 and 6) from the noncontact reading and writing device 50. The coil 60 is an example of a "coil" according to the technique of the present disclosure.

A first conduction portion 62A and a second conduction portion 62B are provided on the back surface 26A of the cartridge memory 19. The first conduction portion 62A and the second conduction portion 62B have solders and electrically connect both end portions of the coil 60 to the IC chip 52 (see FIGS. 6 and 8) and the capacitor 54 (see FIGS. 6 and 8) on the front surface 26B.

Figure 8:
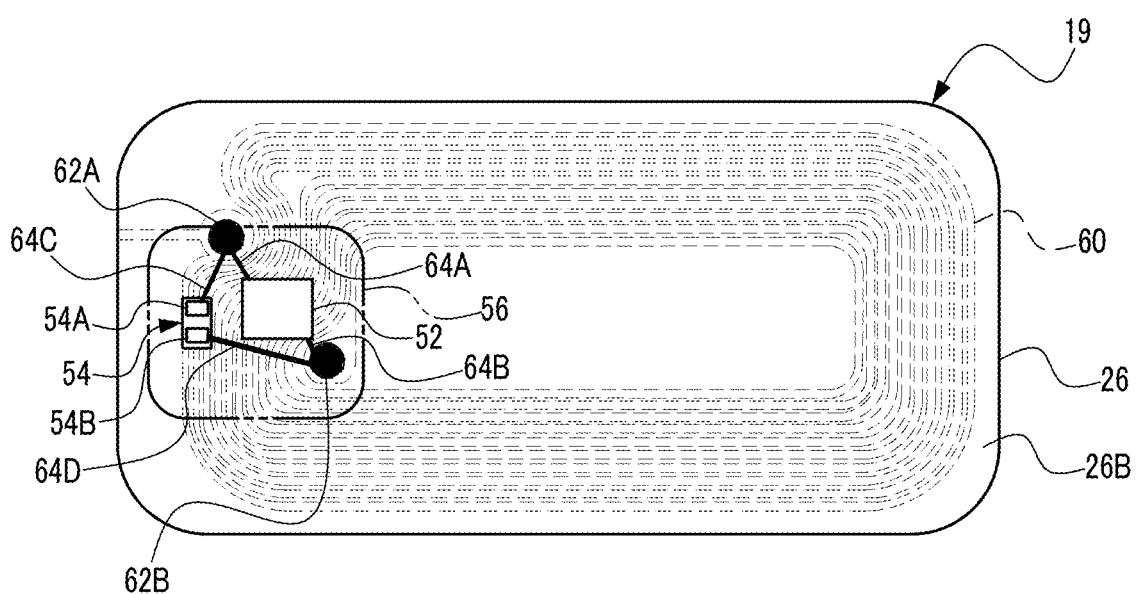
FIG. 8 is a schematic plan view showing an example of the structure of a front surface of the substrate of the cartridge memory in the magnetic tape cartridge according to the first embodiment.

As an example, as shown in FIG. 8, on the front surface 26B of the cartridge memory 19, the IC chip 52 and the capacitor 54 are electrically connected to each other using a wired connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. The IC chip 52 and the capacitor 54 are connected in parallel with the coil 60.

Figure 9:
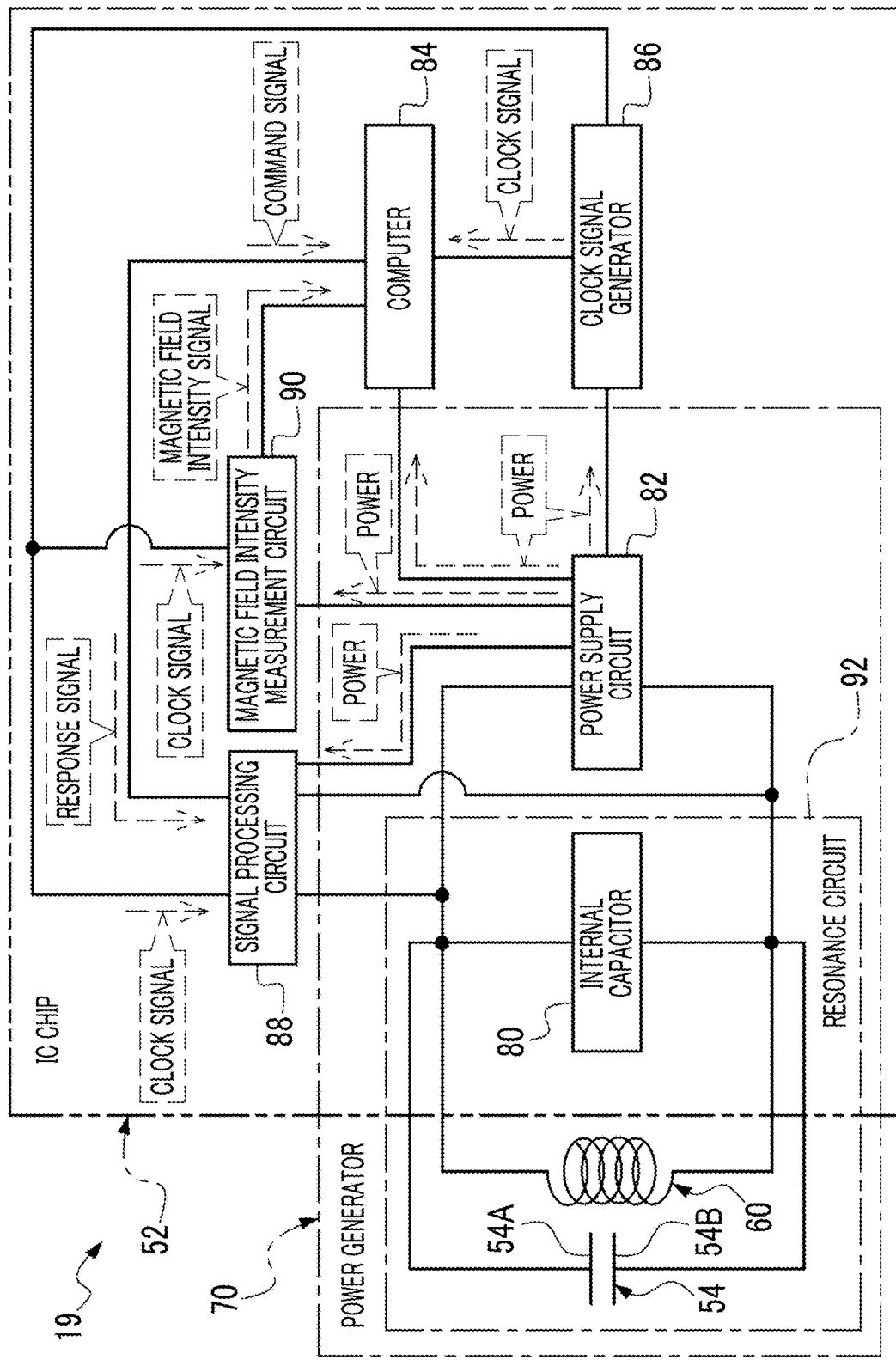
FIG. 9 is a schematic circuit diagram showing an example of the circuit configuration of the cartridge memory in the magnetic tape cartridge according to the first embodiment.

As an example, as shown in FIG. 9, the IC chip 52 comprises an internal capacitor 80, a power supply circuit 82, a computer 84, a clock signal generator 86, a signal processing circuit 88, and a magnetic field intensity measurement circuit 90. The IC chip 52 is a general-use IC chip that is usable for purposes other than the magnetic tape cartridge 10, and functions as an arithmetic device for a magnetic tape cartridge in a case where a program for the magnetic tape cartridge is installed thereon. An example of the program for the magnetic tape cartridge is an operation mode setting processing program 102 described below. The clock signal generator 86 is an example of a "clock signal generator" according to the technique of the present disclosure.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power. The power generator 70 is an example of a "power generator" according to the technique of the present disclosure.

The power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is, for example, 13.56 MHz, and may be appropriately determined according to the specifications and the like of the cartridge memory 19 and/or the noncontact reading and writing device 50. The capacitance of the capacitor 54 is determined based on a measured value of the capacitance of the internal capacitor 80.

The resonance circuit 92 generates an alternating-current power by generating a resonance phenomenon at the resonance frequency determined in advance using the induced current induced by the coil 60 with the magnetic field MF passing through the coil 60, and outputs the generated alternating-current power to the power supply circuit 82.

The power supply circuit 82 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 82 converts the alternating-current power inputted from the resonance circuit 92 into direct-current power and supplies the converted direct-current power (hereinafter, simply referred to as "power") to various drive elements in the IC chip 52. Examples of various drive elements include the computer 84, the clock signal generator 86, the signal processing circuit 88, and the magnetic field intensity measurement circuit 90. In this way, the power is supplied to the various drive elements in the IC chip 52 by the power generator 70, whereby the IC chip 52 operates using the power generated by the power generator 70.

The computer 84 is an example of a "computer" according to the technique of the present disclosure, and controls the entire cartridge memory 19. The computer 84 holds the management information 100 (see FIG. 10).

The clock signal generator 86 generates a clock signal and outputs the clock signal to the various drive elements. The various drive elements operate in accordance with the clock signal inputted from the clock signal generator 86. Although details will be described below, the clock signal generator 86 changes a frequency (hereinafter, referred to as a "clock frequency") of the clock signal in accordance with an instruction of the computer 84. In the clock signal generator 86, the same frequency as the frequency of the magnetic field MF is used as a clock frequency (hereinafter, referred to as a "reference clock frequency") to be a reference, and clock signals of different clock frequencies are generated based on the reference clock frequency. In the embodiment, the clock signal generator 86 selectively generates clock signals of a first frequency to a third frequency. The first frequency is the same frequency as the reference clock frequency, the second frequency is a ½ frequency of the reference clock frequency, and the third frequency is a ¼ frequency of the reference clock frequency (see FIG. 11). That is, the clock frequencies have a relationship that the second frequency is lower than the first frequency and the third frequency is lower than the second frequency. The clock signal is an example of a "clock signal" according to the technique of the present disclosure.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command signal from the magnetic field MF received by the coil 60 and outputs the command signal to the computer 84. The computer 84 outputs a response signal to the command signal to the signal processing circuit 88. That is, the computer 84 executes processing according to the command signal inputted from the signal processing circuit 88 and outputs a processing result as the response signal to the signal processing circuit 88. In the signal processing circuit 88, in a case where the response signal is inputted from the computer 84, the encoding circuit of the signal processing circuit 88 encodes the response signal to modulate the response signal and outputs the response signal to the resonance circuit 92. The coil 60 of the resonance circuit 92 transmits the response signal inputted from the encoding circuit of the signal processing circuit 88 to the noncontact reading and writing device 50 through the magnetic field MF. That is, in a case where the response signal is transmitted from the cartridge memory 19 to the noncontact reading and writing device 50, the response signal is included in the magnetic field MF. In other words, the response signal is superimposed on the magnetic field MF.

The magnetic field intensity measurement circuit 90 measures the intensity of the magnetic field MF based on the power generated by the power supply circuit 82. The power generated by the power supply circuit 82 becomes greater within a limit range as the intensity of the magnetic field MF applied to the resonance circuit 92 is greater. The magnetic field intensity measurement circuit 90 outputs a signal at an output level according to the power generated by the power supply circuit 82 based on a correlation between the power generated by the power supply circuit 82 and the intensity of the magnetic field MF applied to the resonance circuit 92. That is, the magnetic field intensity measurement circuit 90 measures the power generated by the power supply circuit 82, generates a magnetic field intensity signal indicating the intensity of the magnetic field MF based on a measurement result, and outputs the magnetic field intensity signal to the computer 84. The computer 84 can execute processing according to the magnetic field intensity signal inputted from the magnetic field intensity measurement circuit 90.

Figure 10:
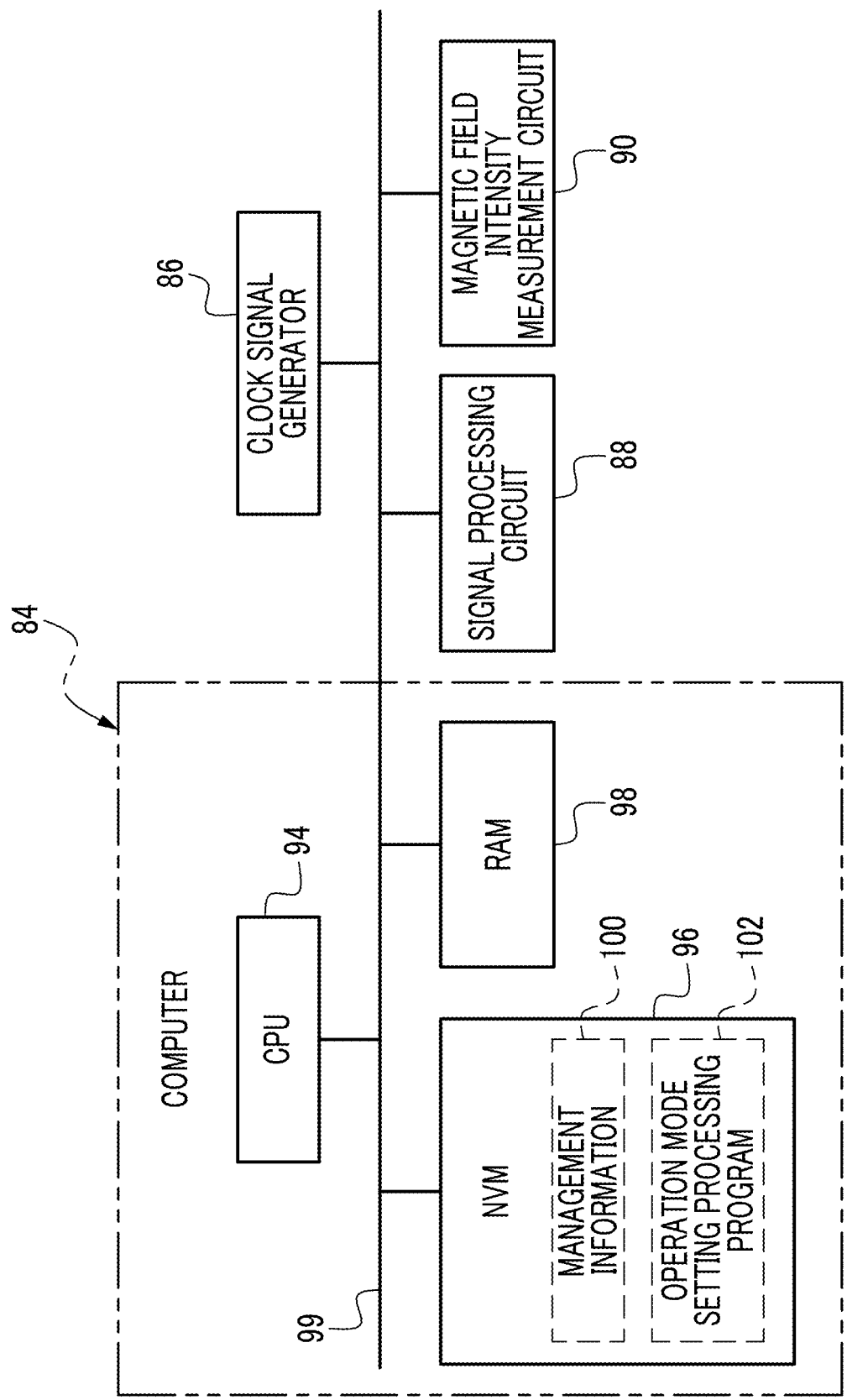
FIG. 10 is a block diagram showing an example of the hardware configuration of a computer of an IC chip that is mounted on the cartridge memory in the magnetic tape cartridge according to the first embodiment.

As an example, as shown in FIG. 10, the computer 84 comprises a CPU 94, an NVM 96, and a RAM 98. The CPU 94, the NVM 96, and the RAM 98 are connected to a bus 99. The clock signal generator 86, the signal processing circuit 88, and the magnetic field intensity measurement circuit 90 are also connected to the bus 99. The CPU 94 is an example of a "processor" according to the technique of the present disclosure.

The NVM 96 is an example of a "first memory", a "second memory", and a "third memory" according to the technique of the present disclosure. Here, as the NVM 96, an EEPROM is employed. The EEPROM is merely an example, and for example, a ferroelectric memory may be used instead of the EEPROM or any type of memory may be used as long as the memory is a nonvolatile memory that can be mounted on the IC chip 52.

The management information 100 is stored in the NVM 96. The CPU 94 selectively executes polling processing, read-out processing, and write-in processing according to the command signal inputted from the signal processing circuit 88. The polling processing is processing of establishing communication with the noncontact reading and writing device 50, and is executed, for example, as preparation processing in a pre-stage of the read-out processing and the write-in processing. The read-out processing is processing of reading out the management information 100 and the like from the NVM 96. The write-in processing is processing of writing the management information 100 and the like in the NVM 96. All of the polling processing, the read-out processing, and the write-in processing (hereinafter, referred to as various types of processing in a case where there is no need for distinction) are executed by the CPU 94 in accordance with the clock signals generated by the clock signal generator 86. That is, the CPU 94 executes various types of processing at processing speeds according to the clock frequencies.

Accordingly, as the clock frequency is higher, the processing speed increases. The increase in the processing speed causes an increase in load imposed on the CPU 94 and an increase in power consumption. As an amount of information, such as the management information 100, becomes greater, an execution time of the read-out processing and the write-in processing by the CPU 94 becomes longer, and there is a concern that the power supplied from the power supply circuit 82 to the CPU 94 and the like is deficient.

One factor for the increase in the load applied to the CPU 94 is that a time (hereinafter, referred to as a "response time") needed from when transmission of the command signal from the noncontact reading and writing device 50 to the cartridge memory 19 is completed until transmission of the response signal to the command signal by the cartridge memory 19 starts is shortened. As the response time is shorter, a high-speed operation of the cartridge memory 19 is needed, and in a case where processing is executed while increasing the clock frequency, power consumption increases. In general, it is known that the response time and a maximum communication distance between the noncontact reading and writing device 50 and the cartridge memory 19 are in a relationship of trade-off. The response time is an example of a "response time" according to the technique of the present disclosure.

In the cartridge memory 19, to prevent an increase in power consumption, operation mode setting processing is executed by the CPU 94. The operation mode setting processing is processing of making the response time longer than a time determined in advance as a standard response time. Here, the time determined in advance as the standard response time is an example of a "first predetermined time" according to the technique of the present disclosure. Hereinafter, the operation mode setting processing will be described.

The operation mode setting processing program 102 is stored in the NVM 96. The CPU 94 reads out the operation mode setting processing program 102 from the NVM 96 and executes the operation mode setting processing program 102 on the RAM 98. The operation mode setting processing is realized by the operation mode setting processing program 102 being executed by the CPU 94.

Figure 11:
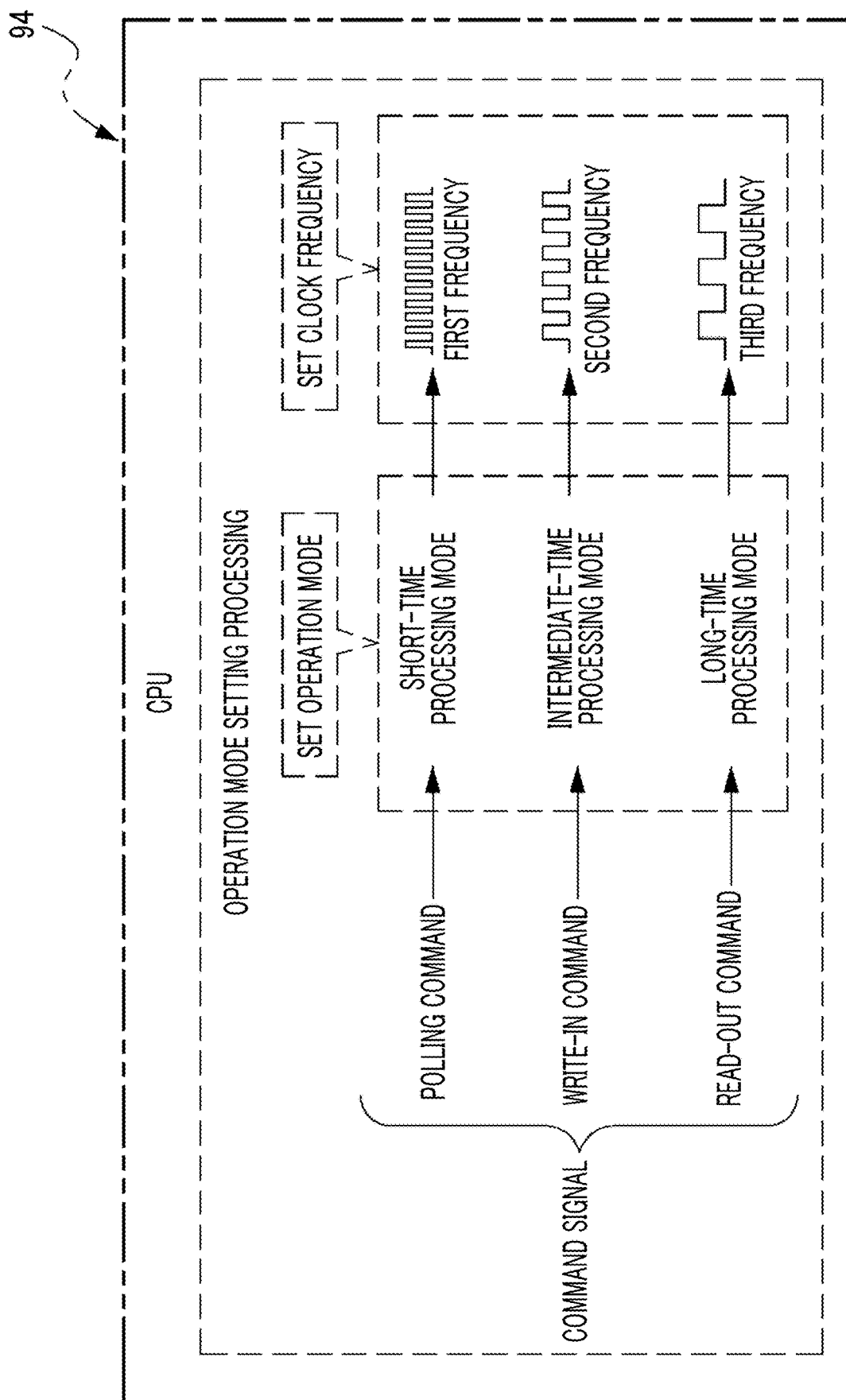
FIG. 11 is a conceptual diagram showing an example of processing contents of operation mode setting processing that is executed by a CPU of the cartridge memory in the magnetic tape cartridge according to the first embodiment.

As an example, as shown in FIG. 11, the CPU 94 executes the operation mode setting processing to set an operation mode (hereinafter, simply referred to as an "operation mode") of the cartridge memory 19 to an operation mode according to the command signal and set the clock frequency according to the operation mode. The CPU 94 changes the operation mode according to the command signal to make a processing time (hereinafter, simply referred to as a "processing time") needed from a start to an end of processing on a command (for example, one command) longer than a predetermined time. In this way, the CPU 94 makes the processing time longer than the predetermined time to make the above-described response time longer than the time determined in advance as the standard response time. Here, the predetermined time is an example of a "second predetermined time" according to the technique of the present disclosure.

The CPU 94 sets the clock frequency according to the operation mode to change the clock frequency. Specifically, the CPU 94 makes the clock frequency lower as the processing time is made longer.

The operation mode is set according to the command indicated by the command signal inputted from the signal processing circuit 88 to the CPU 94. The command indicated by the command signal is a polling command, a read-out command, or a write-in command. In a case where the command indicated by the command signal is the polling command, the CPU 94 executes the polling processing. In a case where the command indicated by the command signal is the read-out command, the CPU 94 executes the read-out processing. In a case where the command indicated by the command signal is the write-in command, the CPU 94 executes the write-in processing. Here, for convenience of description, although one type of signal has been exemplified as a polling signal, the polling signal may be a plurality of types of signals.

The CPU 94 sets, as the operation mode, any one of a long-time processing mode, an intermediate-time processing mode, or a short-time processing mode to adjust the length of the processing time. The processing time is any one of a long time, an intermediate time, or a short time. The long time indicates a time longer than the intermediate time, and the short time indicates a time shorter than the intermediate time. In the long-time processing mode, the time needed for the processing on the command by the CPU 94 becomes a long time. In the intermediate-time processing mode, the time needed for the processing on the command by the CPU 94 becomes an intermediate time. In the short-time processing mode, the time needed for the processing on the command by the CPU 94 becomes a short time.

In an example shown in FIG. 11, in a case where the command indicated by the command signal is the polling command, the CPU 94 sets the short-time processing mode as the operation mode. In a case where the command indicated by the command signal is the write-in command, the CPU 94 sets the intermediate-time processing mode. In a case where the command indicated by the command signal is the read-out command, the CPU 94 sets the long-time processing mode.

The CPU 94 sets the first frequency as the clock frequency in a case where the short-time processing mode is set as the operation mode. That is, the CPU 94 performs control on the clock signal generator 86 such that the clock signal generator 86 generates the clock signal of the first frequency in a case where the short-time processing mode is set as the operation mode.

The CPU 94 sets the second frequency as the clock frequency in a case where the intermediate-time processing mode is set as the operation mode. That is, the CPU 94 performs control on the clock signal generator 86 such that the clock signal generator 86 generates the clock signal of the second frequency in a case where the intermediate-time processing mode is set as the operation mode.

The CPU 94 sets the third frequency as the clock frequency in a case where the long-time processing mode is set as the operation mode. That is, the CPU 94 performs control on the clock signal generator 86 such that the clock signal generator 86 generates the clock signal of the third frequency in a case where the long-time processing mode is set as the operation mode.

In a case where the operation mode changes from the short-time processing mode to the intermediate-time processing mode, the short time is an example of a "second predetermined time" according to the technique of the present disclosure, and the response time corresponding to the short time is an example of the time determined in advance as the standard response time described above, that is, a "first predetermined time" according to the technique of the present disclosure. In a case where the operation mode changes from the intermediate-time processing mode to the long-time processing mode, the intermediate time is an example of a "second predetermined time" according to the technique of the present disclosure, and the response time corresponding to the intermediate time is an example of the time determined in advance as the standard response time described above, that is, a "first predetermined time" according to the technique of the present disclosure. The operation mode changes from the short-time processing mode to the intermediate-time processing mode or changes from the intermediate-time processing mode to the long-time processing mode in this manner, and as a result, the response time is also made to be longer with the change.

Next, the operation of the cartridge memory 19 will be described with reference to FIGS. 12A to 12C.

Figure 12A:
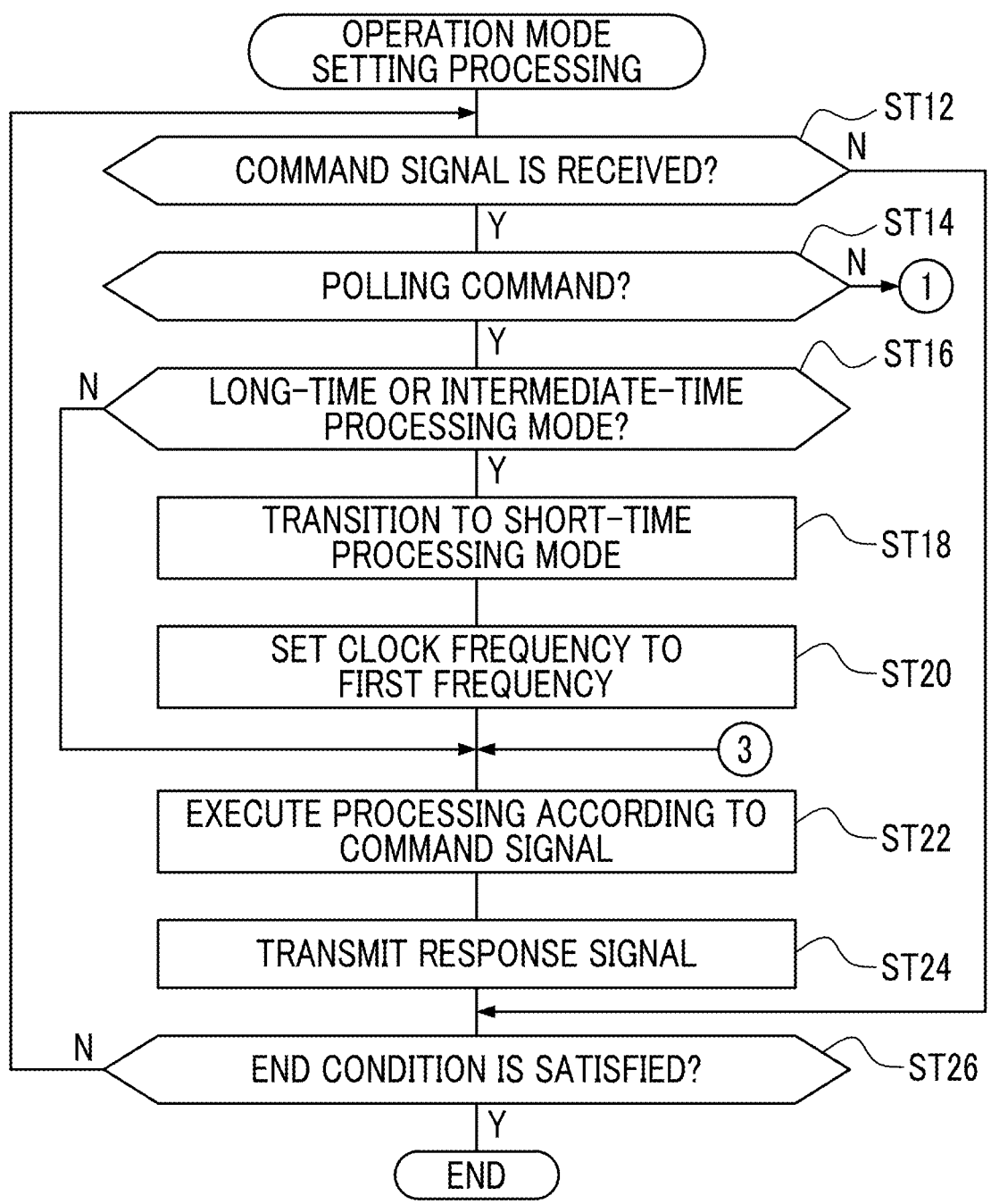
FIG. 12A is a flowchart showing an example of a flow of the operation mode setting processing according to the first embodiment.
Figure 12B:
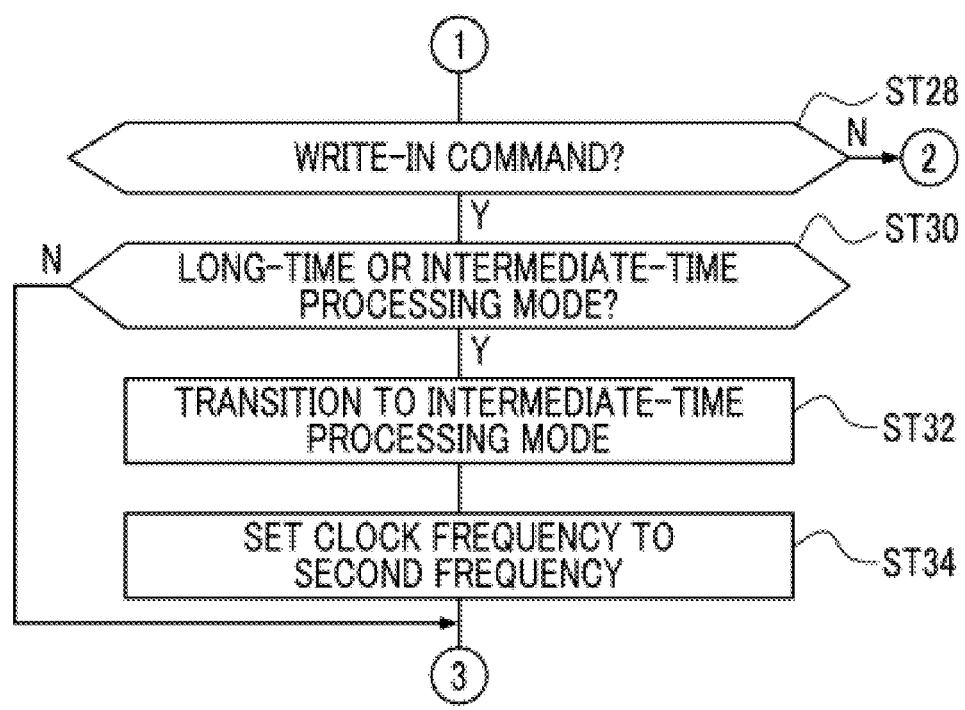
FIG. 12B is a continuation of the flowchart shown in FIG. 12A.
Figure 12C:
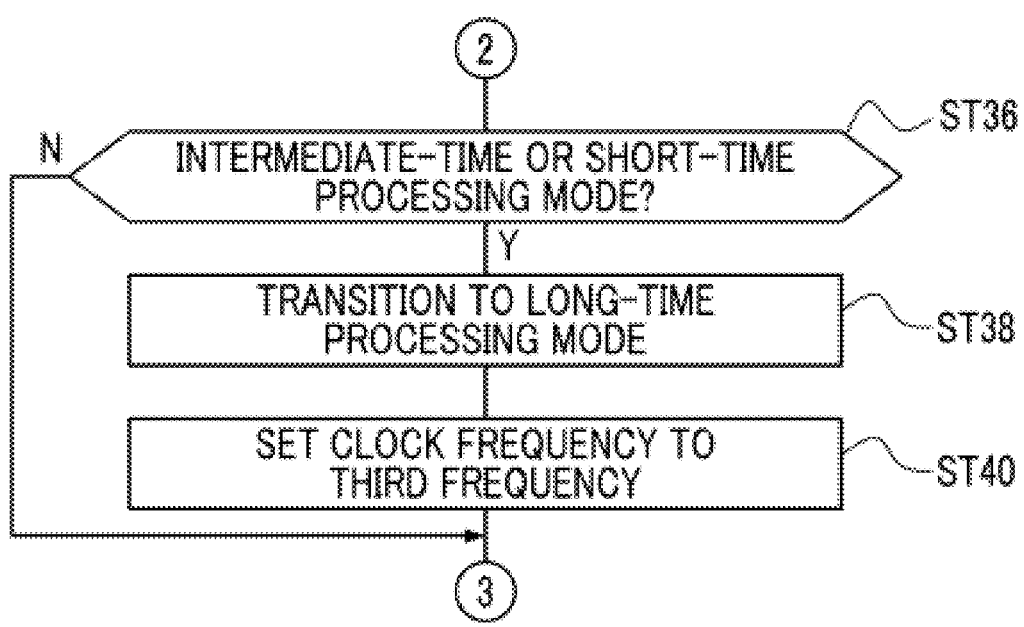
FIG. 12C is a continuation of the flowchart shown in FIG. 12B.

FIGS. 12A to 12C show an example of a flow of the operation mode setting processing that is executed by the CPU 94. The following description of the operation mode setting processing, for convenience of description, is on the precondition that power is supplied from the power supply circuit 82 to the various drive elements. The following description of the operation mode setting processing, for convenience of description, is on the precondition that the command indicated by the command signal is any one of the polling command, the read-out command, or the write-in command. The following description of the operation mode setting processing, for convenience of description, is on the precondition that any one of the long-time processing mode, the intermediate-time processing mode, or the short-time processing mode is set as the operation mode.

In the operation mode setting processing shown in FIG. 12A, first, in Step ST12, the CPU 94 determines whether or not the command signal is received by the signal processing circuit 88. In Step ST12, in a case where the command signal is received by the signal processing circuit 88, determination is affirmative, and the operation mode setting processing goes to Step ST14. In Step ST12, in a case where the command signal is not received by the signal processing circuit 88, negative determination is made, and the operation mode setting processing goes to Step ST26.

In Step ST14, the CPU 94 determines whether or not the command indicated by the command signal received by the signal processing circuit 88 in Step ST12 is the polling command. In Step ST14, in a case where the command indicated by the command signal received by the signal processing circuit 88 is not the polling command, negative determination is made, and the operation mode setting processing goes to Step ST28 shown in FIG. 12B. In Step ST14, in a case where the command indicated by the command signal received by the signal processing circuit 88 is the polling command, affirmative determination is made, and the operation mode setting processing goes to Step ST16.

In Step ST16, the CPU 94 determines whether or not the operation mode set at the present time is the long-time processing mode or the intermediate-time processing mode. In Step ST16, in a case where the operation mode set at the present time is not the long-time processing mode or the intermediate-time processing mode (in a case where the operation mode set at the present time is the short-time processing mode), negative determination is made, and the operation mode setting processing goes to Step ST22. In Step ST16, in a case where the operation mode set at the present time is the long-time processing mode or the intermediate-time processing mode, affirmative determination is made, and the operation mode setting processing goes to Step ST18.

In Step ST18, the CPU 94 changes the operation mode to the short-time processing mode, and thereafter, the operation mode setting processing goes to Step ST20.

In Step ST20, the CPU 94 sets the clock frequency at the first frequency, and thereafter, the operation mode setting processing goes to Step ST22.

On the other hand, in Step ST28 shown in FIG. 12B, the CPU 94 determines whether or not the command indicated by the command signal received by the signal processing circuit 88 in Step ST12 is the write-in command. In Step ST28, in a case where the command indicated by the command signal received by the signal processing circuit 88 is not the write-in command (in a case where the command indicated by the command signal received by the signal processing circuit 88 is the read-out command), negative determination is made, and the operation mode setting processing goes to Step ST36 shown in FIG. 12C. In Step ST28, in a case where the command indicated by the command signal received by the signal processing circuit 88 is the read-out command, affirmative determination is made, and the operation mode setting processing goes to Step ST30.

In Step ST30, the CPU 94 determines whether or not the operation mode set at the present time is the long-time processing mode or the short-time processing mode. In Step ST30, in a case where the operation mode set at the present time is not either the long-time processing mode or the short-time processing mode (in a case where the operation mode set at the present time is the intermediate-time processing mode), negative determination is made, and the operation mode setting processing goes to Step ST22 shown in FIG. 12A. In Step ST30, in a case where the operation mode set at the present time is the long-time processing mode or the short-time processing mode, affirmative determination is made, and the operation mode setting processing goes to Step ST32.

In Step ST32, the CPU 94 changes the operation mode to the intermediate-time processing mode, and thereafter, the operation mode setting processing goes to Step ST34.

In Step ST34, the CPU 94 sets the clock frequency at the second frequency, and thereafter, the operation mode setting processing goes to Step ST22 shown in FIG. 12A.

On the other hand, in Step ST36 shown in FIG. 12C, the CPU 94 determines whether or not the operation mode set at the present time is the intermediate-time processing mode or the short-time processing mode. In Step ST36, in a case where the operation mode set at the present time is not either the intermediate-time processing mode or the short-time processing mode (in a case where the operation mode set at the present time is the long-time processing mode), negative determination is made, and the operation mode setting processing goes to Step ST22 shown in FIG. 12A. In Step ST36, in a case where the operation mode set at the present time is the intermediate-time processing mode or the short-time processing mode, affirmative determination is made, and the operation mode setting processing goes to Step ST38.

In Step ST38, the CPU 94 changes the operation mode to the long-time processing mode, and thereafter, the operation mode setting processing goes to Step ST40.

In Step ST40, the CPU 94 sets the clock frequency at the third frequency, and thereafter, the operation mode setting processing goes to Step ST22 shown in FIG. 12A.

In Step ST22 shown in FIG. 12A, the CPU 94 executes processing according to the command signal received by the signal processing circuit 88 in Step ST12, and thereafter, the operation mode setting processing goes to Step ST24.

In Step ST24, the CPU 94 makes the signal processing circuit 88 and the resonance circuit 92 transmit the response signal indicating a processing result obtained by the execution of the processing of Step ST22 to the noncontact reading and writing device 50 through the magnetic field MF, and thereafter, the operation mode setting processing goes to Step ST26.

In Step ST26, the CPU 94 determines whether or not a condition (hereinafter, referred to as an "operation mode setting processing end condition") for ending the operation mode setting processing is satisfied. Examples of the operation mode setting processing end condition include a condition that the magnetic field MF has disappeared. Determination on whether or not the magnetic field MF has disappeared is performed by the CPU 94 based on a magnetic field intensity signal inputted from the magnetic field intensity measurement circuit 90 to the CPU 94. In Step ST26, in a case where the operation mode setting processing end condition is not satisfied, negative determination is made, and the operation mode setting processing goes to Step ST12. In Step ST26, in a case where the operation mode setting processing end condition is satisfied, affirmative determination is made, and the operation mode setting processing ends.

As described above, in the cartridge memory 19, the processing time is set longer than the predetermined time by the CPU 94, and the response time also becomes longer to an extent that the processing time becomes longer. As the processing time becomes longer, that is, as the response time becomes longer, a lower clock frequency is set. That is, in a case where the operation mode is shifted from the short-time processing mode to the intermediate-time processing mode, the processing time becomes longer, and the response time also becomes longer. Shift from the short-time processing mode to the intermediate-time processing mode means that the processing time turns from the short time to the intermediate time. The clock frequency is changed from the first frequency to the second frequency accordingly. Since the second frequency does not have the clock frequency of "0", the CPU 94 can execute the processing according to the command signal at the second frequency.

In a case where the operation mode is shifted from the intermediate-time processing mode to the long-time processing mode, the processing time turns from the intermediate time to the long time, and the response time also becomes longer to an extent that the processing time becomes longer. The clock frequency is changed from the second frequency to the third frequency accordingly. Since the third frequency does not have the clock frequency of "0", the CPU 94 can execute the processing according to the command signal at the third frequency. As the clock frequency becomes lower, power consumption in the CPU 94 is reduced.

Accordingly, with this configuration, it is possible to realize both stabilization of the operation and reduction in power consumption of the cartridge memory 19. Here, although an aspect where the processing time is changed in a stepwise manner, and the clock frequency is also changed in a stepwise manner has been exemplified, the technique of the present disclosure is not limited thereto. The processing time may be changed in a stepless manner, and accordingly, the clock frequency may be changed in a stepless manner.

In the cartridge memory 19, the processing time on one command by the CPU 94 is set longer than the predetermined time, and as the processing time becomes longer, the lower clock frequency is set. Accordingly, with this configuration, even though the processing on one command is executed by the CPU 94, it is possible to realize both stabilization of the operation and reduction in power consumption of the cartridge memory 19.

In the cartridge memory 19, the response signal indicating the processing result obtained by the execution of the processing according to the command signal by the CPU 94 is transmitted to the noncontact reading and writing device 50 through the magnetic field MF. Accordingly, with this configuration, it is possible to transmit the processing result to the noncontact reading and writing device 50 even though a magnetic field different from the magnetic field MF is not applied to the coil 60.

In the cartridge memory 19, the processing according to the command signal is not constantly executed by the CPU 94 in accordance with the clock signal of the first frequency, and the length of the response time is changed according to the type of the command indicated by the command signal. Accordingly, with this configuration, it is possible to prevent excess or deficiency of power and the processing time, compared to a case where the processing time is constantly fixed regardless of the type of the command.

In the cartridge memory 19, the time needed for the read-out processing or the write-in processing is longer than the time needed for the polling processing. Accordingly, with this configuration, since the read-out processing and the write-in processing are executed at the clock frequency lower than the clock frequency used in the polling processing, it is possible to reduce power consumption, as compared to a case where the polling processing is executed. That is, it is possible to prevent the occurrence of a situation in which the read-out processing and the write-in processing are not completed due to power deficiency, compared to a case where the same clock frequency as in the polling processing is used in the read-out processing and the write-in processing.

In the above-described embodiment, although an aspect in which the processing of Step ST12 is executed in the operation mode setting processing regardless of the intensity of the magnetic field MF has been described, the technique of the present disclosure is not limited thereto. For example, as shown in FIG. 13, in the operation mode setting processing, the processing of Step ST10 may be executed in a pre-stage of Step ST12.

Figure 13:
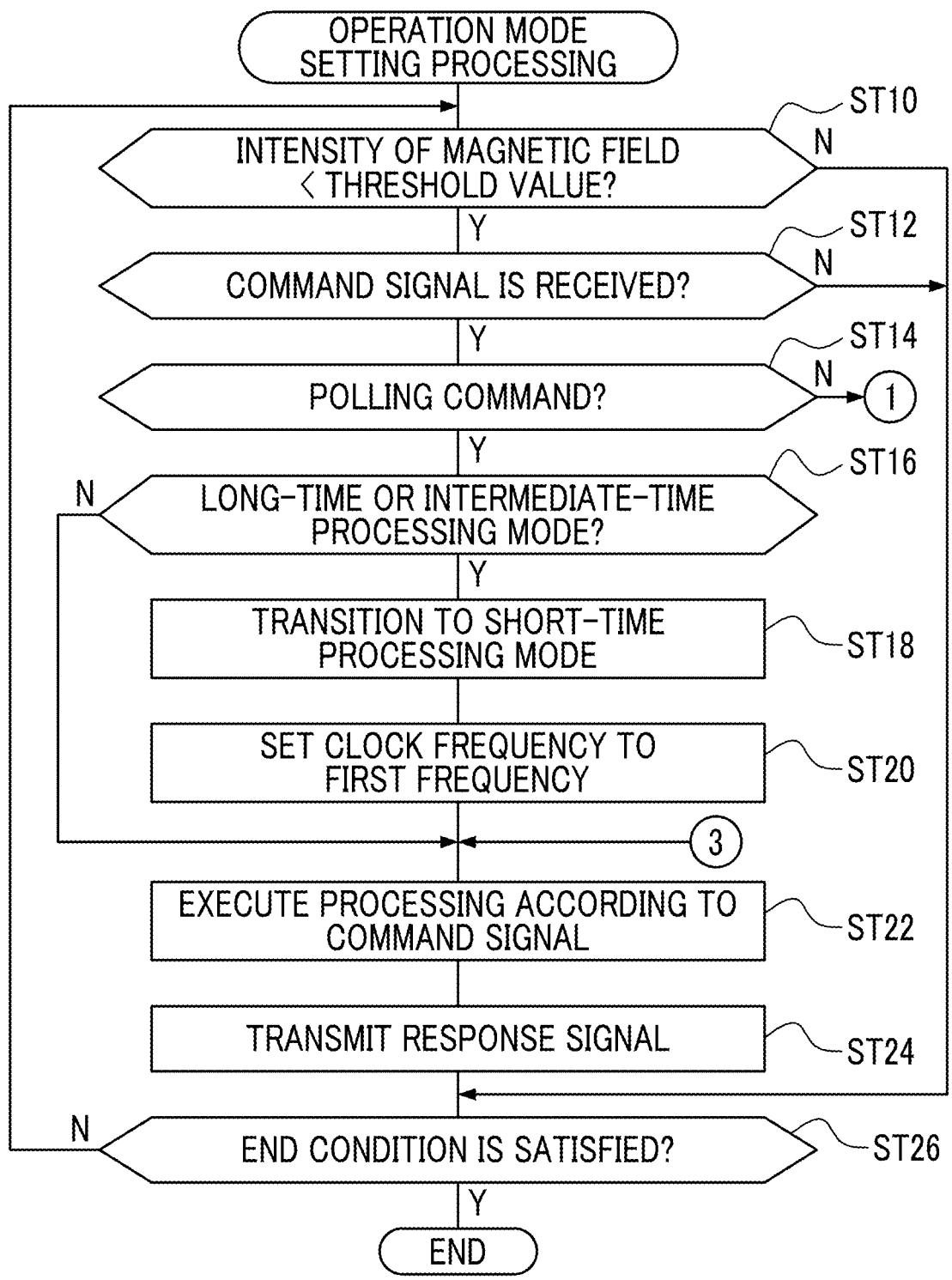
FIG. 13 is a flowchart showing a first modification example of the flow of the operation mode setting processing according to the first embodiment.

The operation mode setting processing shown in FIG. 13 is different from the operation mode setting processing shown in FIGS. 12A to 12C in that the clock signal of the first frequency is supplied to the various drive elements by the clock signal generator 86 in advance as a premise of the execution of the operation mode setting processing. The operation mode setting processing shown in FIG. 13 is different from the operation mode setting processing shown in FIGS. 12A to 12C in that processing of Step ST10 is provided.

In Step ST10 shown in FIG. 13, the CPU 94 determines whether or not the intensity of the magnetic field MF is less than a threshold value based on the magnetic field intensity signal. Here, the threshold value is, for example, is a value derived in advance by at least one of a test with a real machine, a computer simulation, or the like as a lower limit value of the intensity of the magnetic field at which power deficiency does not occur even though the clock signal of the first frequency is supplied to the various drive elements.

In Step ST10, in a case where the intensity of the magnetic field MF is equal to or greater than the threshold value, negative determination is made, and the operation mode setting processing goes to Step ST26. In Step ST10, in a case where the intensity of the magnetic field MF is less than the threshold value, affirmative determination is made, and the operation mode setting processing goes to Step ST12.

That is, in a case where the intensity of the magnetic field MF is equal to or greater than the threshold value, the clock signal of the first frequency is maintained. Accordingly, with this configuration, it is possible to avoid the processing time from becoming longer although there is no concern that power deficiency occurs.

In a case where the intensity of the magnetic field MF is less than the threshold value, the operation mode is changed according to the type of the command indicated by the command signal and the clock frequency is changed according to the operation mode. Accordingly, with this configuration, it is possible to prevent excess or deficiency of power and the processing time, compared to a case where the processing time is constantly fixed regardless of the intensity of the magnetic field MF.

In the example shown in FIG. 13, although determination on whether or not the intensity of the magnetic field MF is less than the threshold value is performed in a pre-stage of Step ST12, the technique of the present disclosure is not limited thereto. For example, as shown in FIG. 14, Step ST15 may be inserted between Step ST14 and Step ST16.

Figure 14:
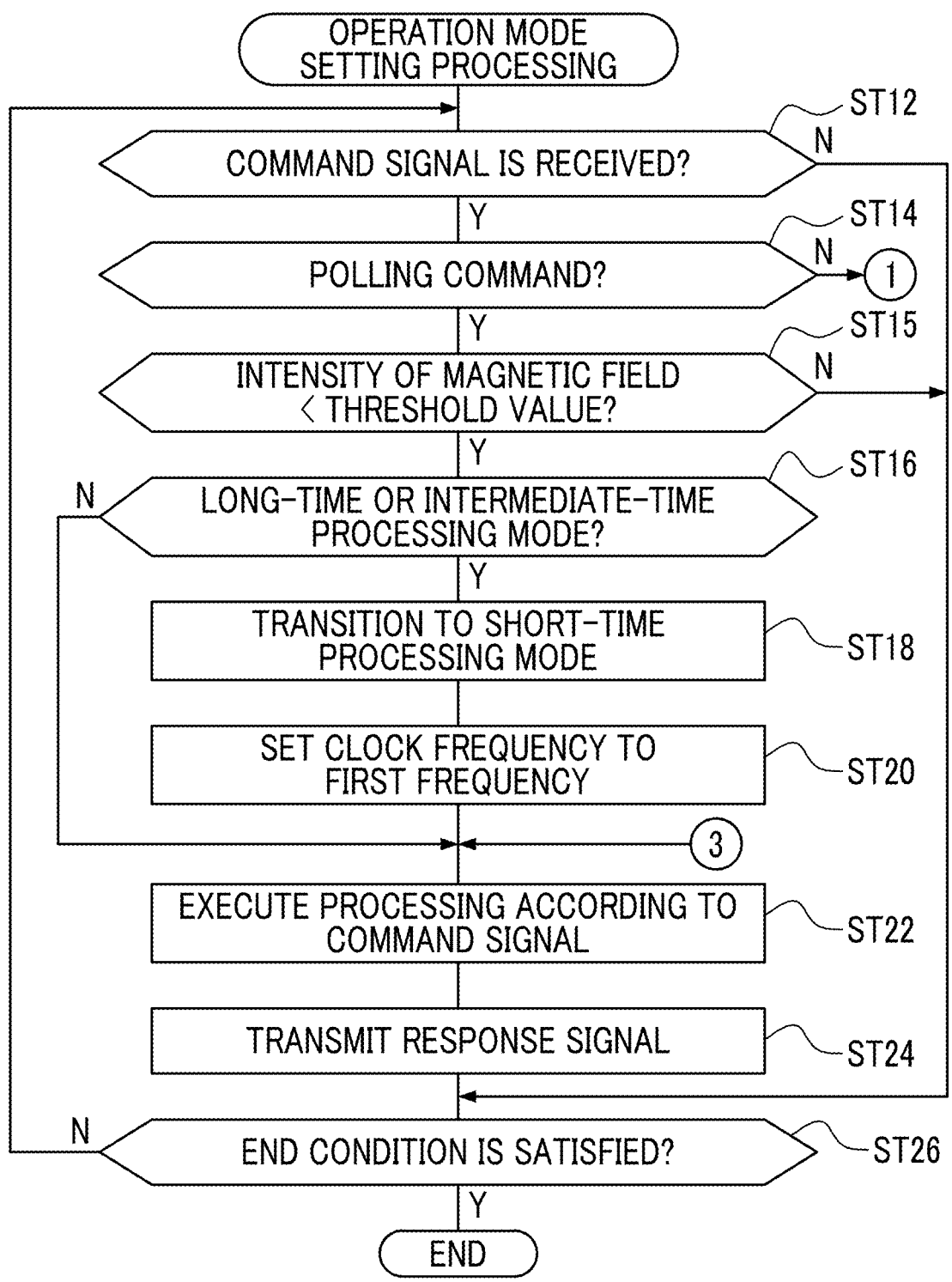
FIG. 14 is a flowchart showing a second modification example of the flow of the operation mode setting processing according to the first embodiment.

In Step ST15 shown in FIG. 14, the same determination as in the processing of Step ST12 described above is performed. Then, in Step ST15, in a case where the intensity of the magnetic field MF is equal to or greater than the threshold value, negative determination is made, and the operation mode setting processing goes to Step ST26. In Step ST15, in a case where the intensity of the magnetic field MF is less than the threshold value, affirmative determination is made, and the operation mode setting processing goes to Step ST16.

The operation mode setting processing described in the above-described embodiment is merely an example, and the technique of the present disclosure is not limited thereto. For example, operation mode setting processing shown in FIG. 15 may be executed by the CPU 94 instead of the operation mode setting processing shown in FIG. 12B. The operation mode setting processing shown in FIG. 15 is different from the operation mode setting processing shown in FIG. 12B in that processing of Step ST29 is provided.

Figure 15:
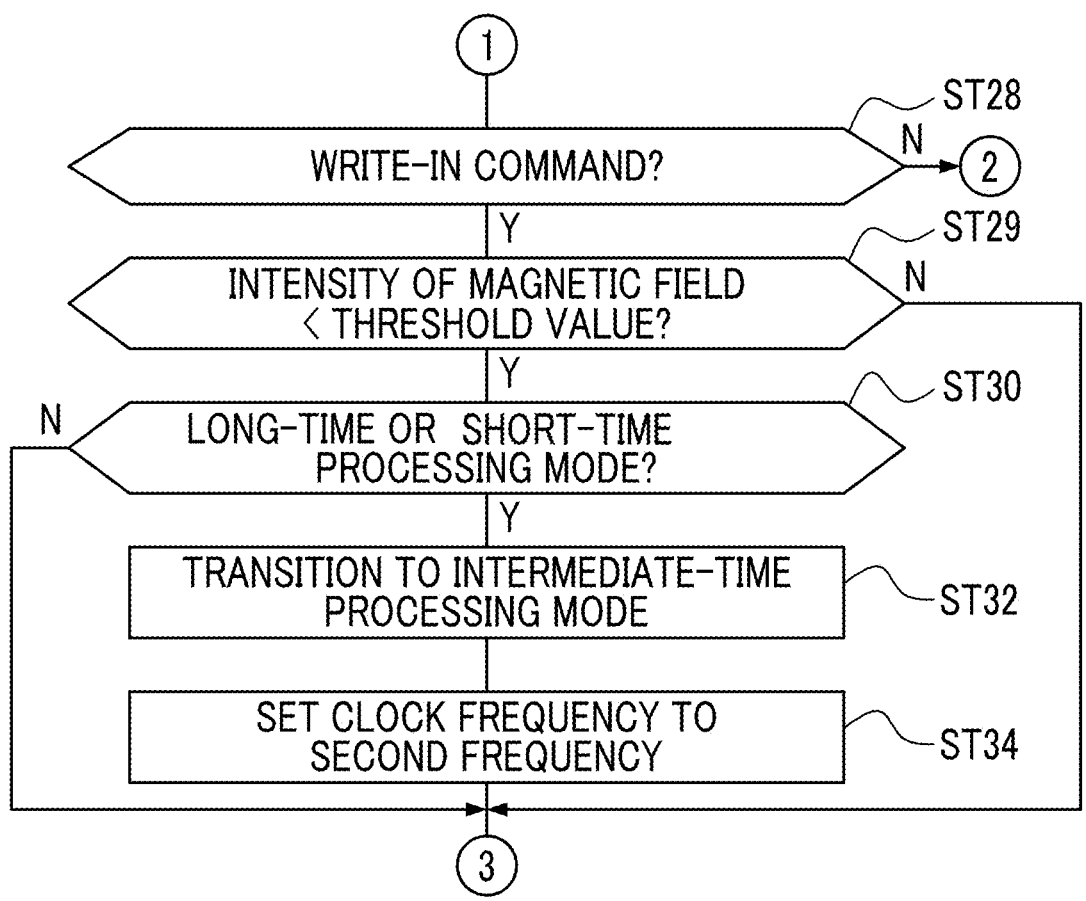
FIG. 15 is a flowchart showing a third modification example of the flow of the operation mode setting processing according to the first embodiment.

In Step ST29 shown in FIG. 15, the CPU 94 determines whether or not the intensity of the magnetic field MF is less than the threshold value based on the magnetic field intensity signal. In Step ST29, in a case where the intensity of the magnetic field MF is equal to or greater than the threshold value, negative determination is made, and the operation mode setting processing goes to Step ST22 shown in FIG. 12A. In Step ST29, in a case where the intensity of the magnetic field MF is less than the threshold value, affirmative determination is made, and the operation mode setting processing goes to Step ST30.

The operation mode setting processing described in the above-described first embodiment is merely an example, and the technique of the present disclosure is not limited thereto. For example, operation mode setting processing shown in FIG. 16 may be executed by the CPU 94 instead of the operation mode setting processing shown in FIG. 12C. The operation mode setting processing shown in FIG. 16 is different from the operation mode setting processing shown in FIG. 12C in that processing of Step ST35 is provided.

Figure 16:
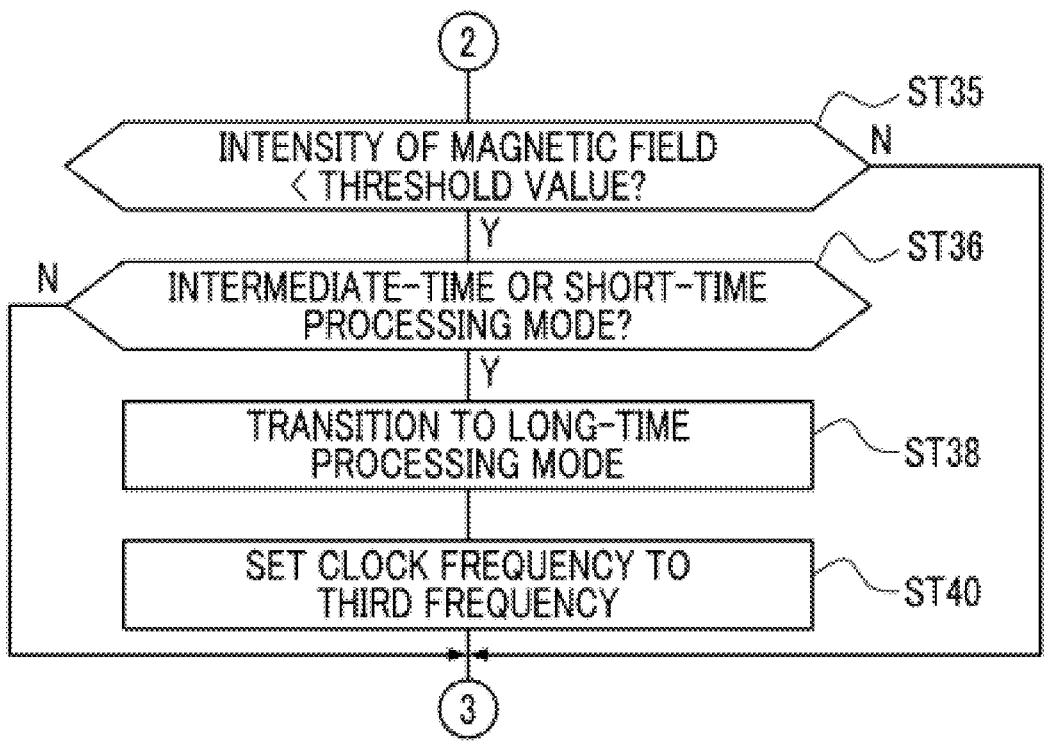
FIG. 16 is a flowchart showing a fourth modification example of the flow of the operation mode setting processing according to the first embodiment.

In Step ST35 shown in FIG. 16, the CPU 94 determines whether or not the intensity of the magnetic field MF is less than the threshold value based on the magnetic field intensity signal. In Step ST35, in a case where the intensity of the magnetic field MF is equal to or greater than the threshold value, negative determination is made, and the operation mode setting processing goes to Step ST22 shown in FIG.

12A. In Step ST35, in a case where the intensity of the magnetic field MF is less than the threshold value, affirmative determination is made, and the operation mode setting processing goes to Step ST36.

In the examples shown in FIGS. 12B and 15, although, in a case where the command indicated by the command signal is the write-in command, the intermediate-time processing mode is set, and the second frequency is set as the clock frequency, the technique of the present disclosure is not limited thereto. In a case where the command indicated by the command signal is the write-in command, the long-time processing mode may be set, and the third frequency may be set as the clock frequency.

In the examples shown in FIGS. 12C and 16, although, in a case where the command indicated by the command signal is the read-out command, the long-time processing mode is set, and the third frequency is set as the clock frequency, the technique of the present disclosure is not limited thereto. In a case where the command indicated by the command signal is the read-out command, the intermediate-time processing mode may be set, and the second frequency may be set as the clock frequency.

In this way, in a case where the command indicated by the command signal is the write-in command and in a case where the command indicated by the command signal is the read-out command, the processing time may be the intermediate time or the long time longer than the short time, and the clock frequency may be higher than the first frequency.

In the examples shown in FIGS. 13 to 16, although an aspect where the response time is changed according to the intensity of the magnetic field MF has been described, the response time may be fixed regardless of the intensity of the magnetic field MF.

Figure 17:
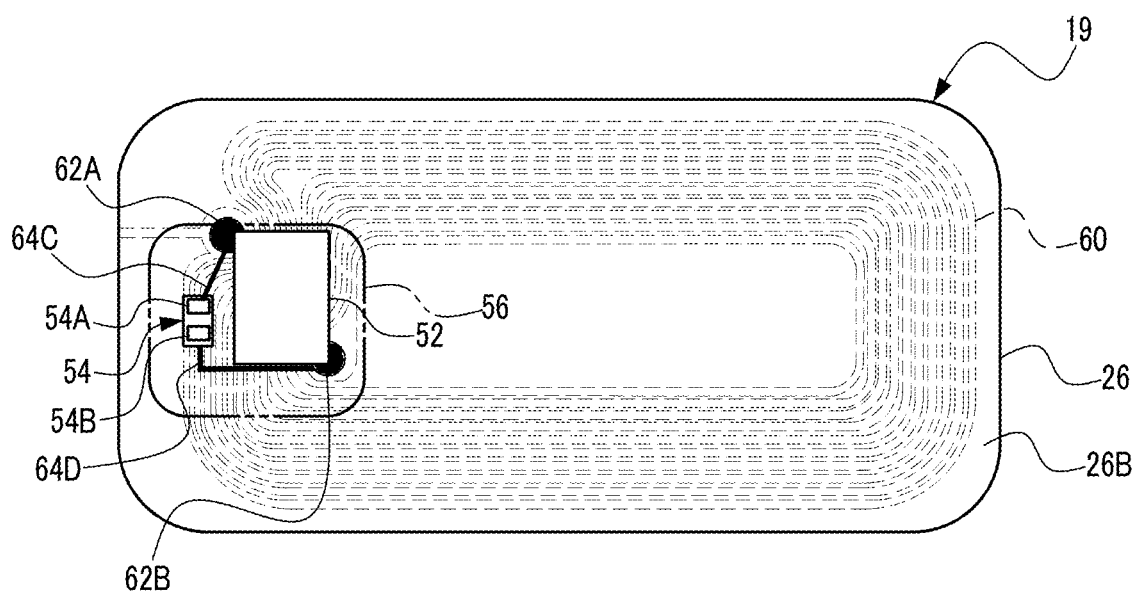
FIG. 17 is a schematic plan view of the cartridge memory in the magnetic tape cartridge according to the first embodiment, and a schematic plan view showing a modification example of a connection form of a coil and an IC chip.

In the above-described first embodiment, although an aspect where the IC chip 52 and the coil 60 are connected using the wired connection method has been described, the technique of the present disclosure is not limited thereto. For example, as shown in FIG. 17, the IC chip 52 and the coil 60 may be connected using a flip-chip connection method. In this case, for example, one terminal of the positive electrode terminal and the negative electrode terminal of the IC chip 52 is connected directly to the first conduction portion 62A, and the other terminal is connected directly to the second conduction portion 62B.

In the above-described first embodiment, although the second frequency is set to the ½ frequency of the first frequency, and the third frequency is set to the ¼ frequency of the first frequency, the technique of the present disclosure is not limited thereto. The second frequency should be a frequency lower than the first frequency, and the third frequency should be a frequency lower than the second frequency. At least one of a level at which the second frequency is made lower than the first frequency or a level at which the third frequency is made lower than the second frequency may be changed according to a voltage remaining in the capacitor 54 and the internal capacitor 80, that is, power remaining in the cartridge memory 19. In this case, for example, the computer 84 sets the second frequency to a frequency equal to or less than ⅓ of the first frequency in a case where power remaining in the cartridge memory 19 is lower than a threshold value, and performs control such that the clock signal generator 86 makes the third frequency be the same frequency as the second frequency or makes the third frequency lower than the second frequency.

Second Embodiment

The above-described first embodiment explains, by way of example, the case of changing the operation mode according to the command signal, but this second embodiment explains, by way of example, the case of changing the operation mode according to a communication distance D that indicates the distance between the noncontact reading and writing device 50 and the cartridge memory 19. In the second embodiment, elements that are the same as or identical to the elements described in the above-described first embodiment are indicated with the same reference numerals, and the description thereof is omitted.

Figure 18:
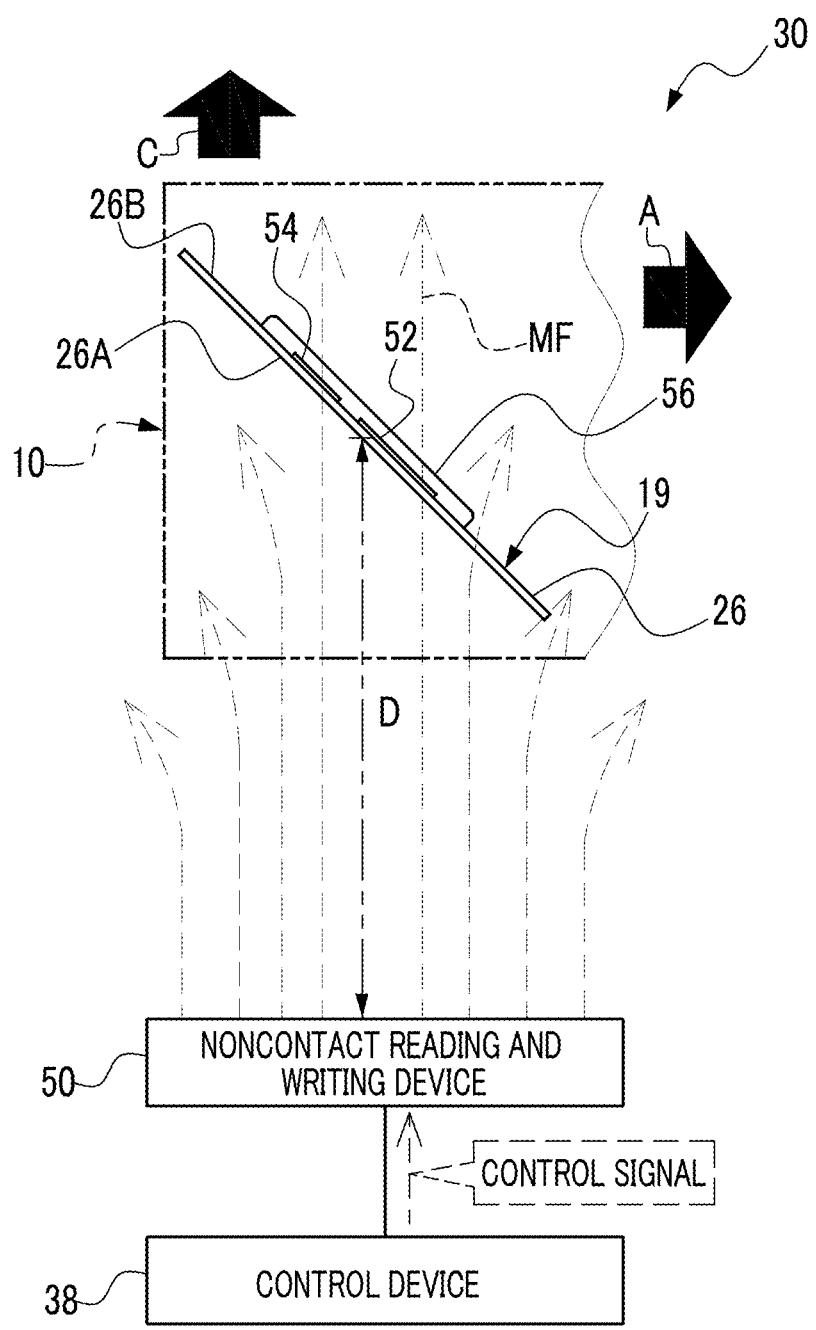
FIG. 18 is a conceptual diagram showing an example of a communication distance.

As shown in FIG. 18, as an example, the communication distance D is the distance between a magnetic field discharge surface of the noncontact reading and writing device 50 and the center of the back surface 26A of the substrate 26 of the cartridge memory 19 in the direction of a short side. The communication distance D is an example of "a characteristic of a magnetic tape cartridge" and "a characteristic of a communicatee" according to the technique of the present disclosure.

The size of the case 12 of the magnetic tape cartridge 10 and the disposition of the cartridge memory 19 in the magnetic tape cartridge 10 are determined in advance depending on the type of the case 12. The size of the magnetic tape drive 30 and the loading position of the magnetic tape cartridge 10 in the magnetic tape drive 30 are determined in advance depending on the type of the magnetic tape drive 30. The size of the noncontact reading and writing device 50 is determined in advance depending on the type of the noncontact reading and writing device 50, and the position of the noncontact reading and writing device 50, relative to the magnetic tape drive 30, is fixed. Thus, in a state where the magnetic tape cartridge 10 is loaded into the magnetic tape drive 30, the communication distance D is led based on the type of the magnetic tape cartridge 10, the type of the magnetic tape drive 30, and the type of the noncontact reading and writing device 50.

Figure 19:
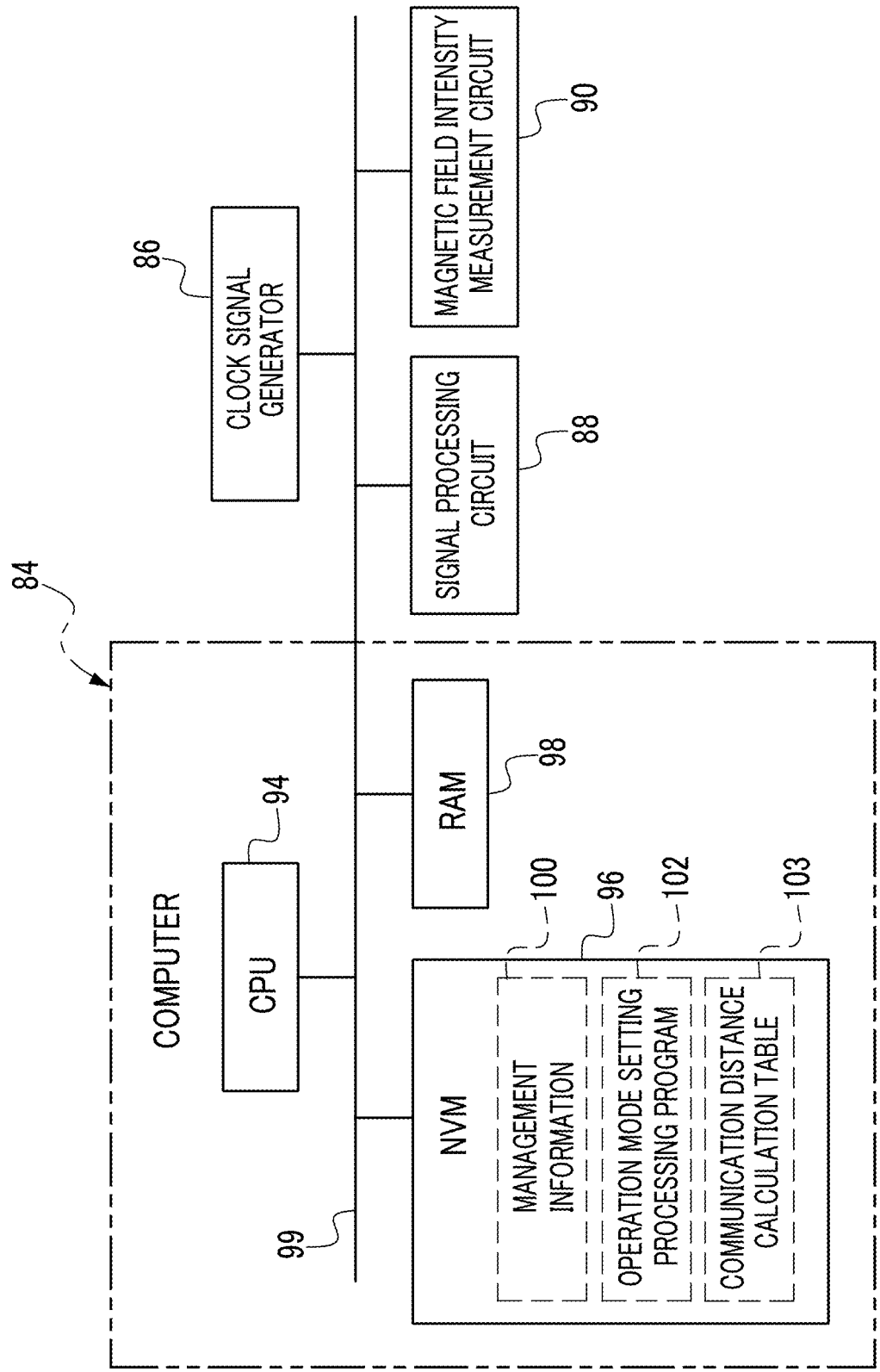
FIG. 19 is a block diagram showing an example of the hardware configuration of a computer of an IC chip that is mounted on a cartridge memory in a magnetic tape cartridge according to a second embodiment.

As shown in FIG. 19, as an example, a communication distance calculation table 103 is stored in the NVM 96. A plurality of types of communication distance calculation tables 103 corresponding to the types of magnetic tape cartridges 10 are prepared in a maker of the magnetic tape cartridge 10, and one of the communication distance calculation tables 103 that corresponds to the type of the magnetic tape cartridge 10 containing the cartridge memory 19 having the NVM 96 is stored in the NVM 96. The CPU 94 calculates the communication distance D based on the communication distance calculation table 103 stored in the NVM 96.

Figure 20:
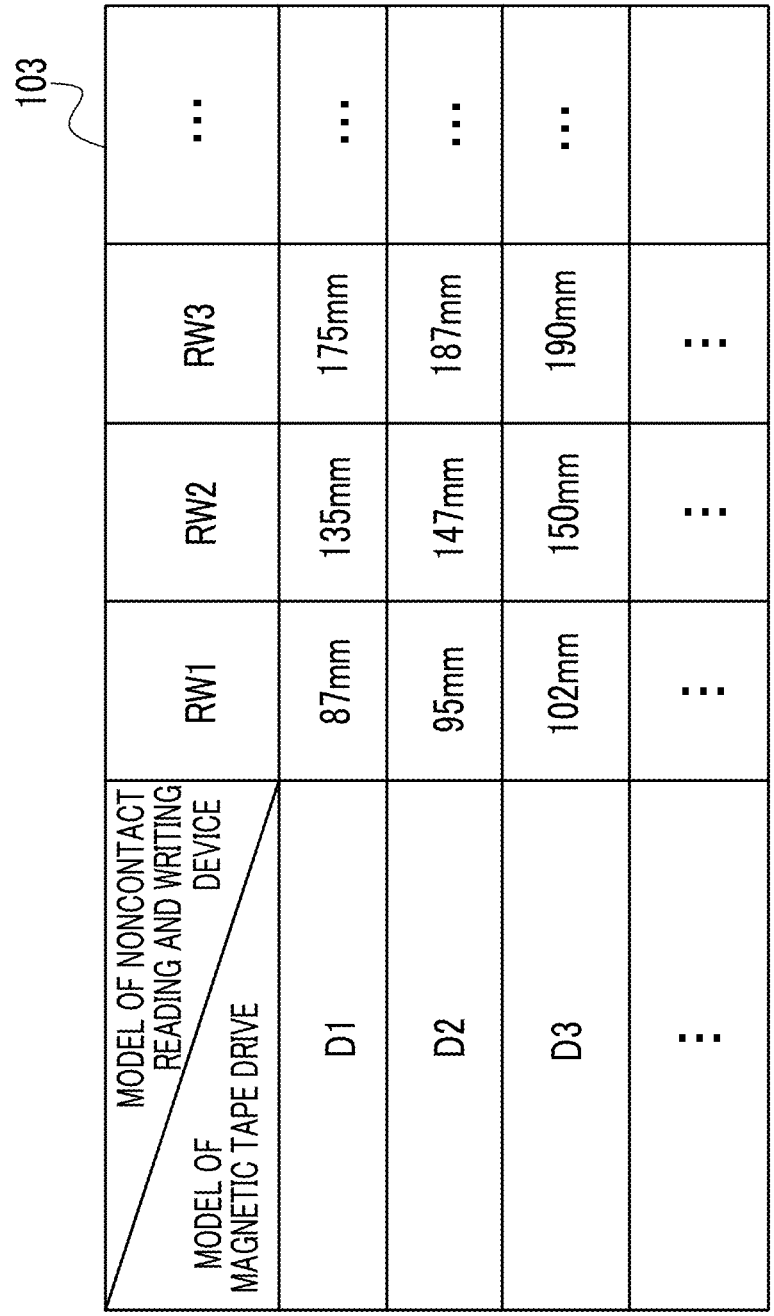
FIG. 20 is an explanatory view showing an example of a communication distance calculation table according to the second embodiment.

As shown in FIG. 20, as an example, the communication distance calculation table 103 provides communication distances D, which correspond to the types of magnetic tape drives 30 and the types of noncontact reading and writing devices 50. The CPU 94 obtains the type of the magnetic tape drive 30 and the type of the noncontact reading and writing device 50 from the noncontact reading and writing device 50 through the magnetic field MF. More specifically, for example, a control signal (see FIG. 6) outputted from the control device 38 of the magnetic tape drive 30 to the noncontact reading and writing device 50 includes magnetic tape drive type information indicating the type (a model name of the magnetic tape drive 30 in the example shown in FIG. 20) of the magnetic tape drive 30 and reading and writing device type information indicating the type (a model name of the noncontact reading and writing device 50 in the example shown in FIG. 20) of the noncontact reading and writing device 50. The noncontact reading and writing device 50 discharges a magnetic field MF that includes the magnetic tape drive type information and the reading and writing device type information, in addition to a command signal, toward the cartridge memory 19 in response to the command signal inputted from the control device 38.

The CPU 94 receives the command signal, the magnetic tape drive type information, and the reading and writing device type information that are extracted from the magnetic field MF by the signal processing circuit 88. The CPU 94 calculates the communication distance D using the received magnetic tape drive type information and the received reading and writing device type information based on the communication distance calculation table 103.

Figure 21:
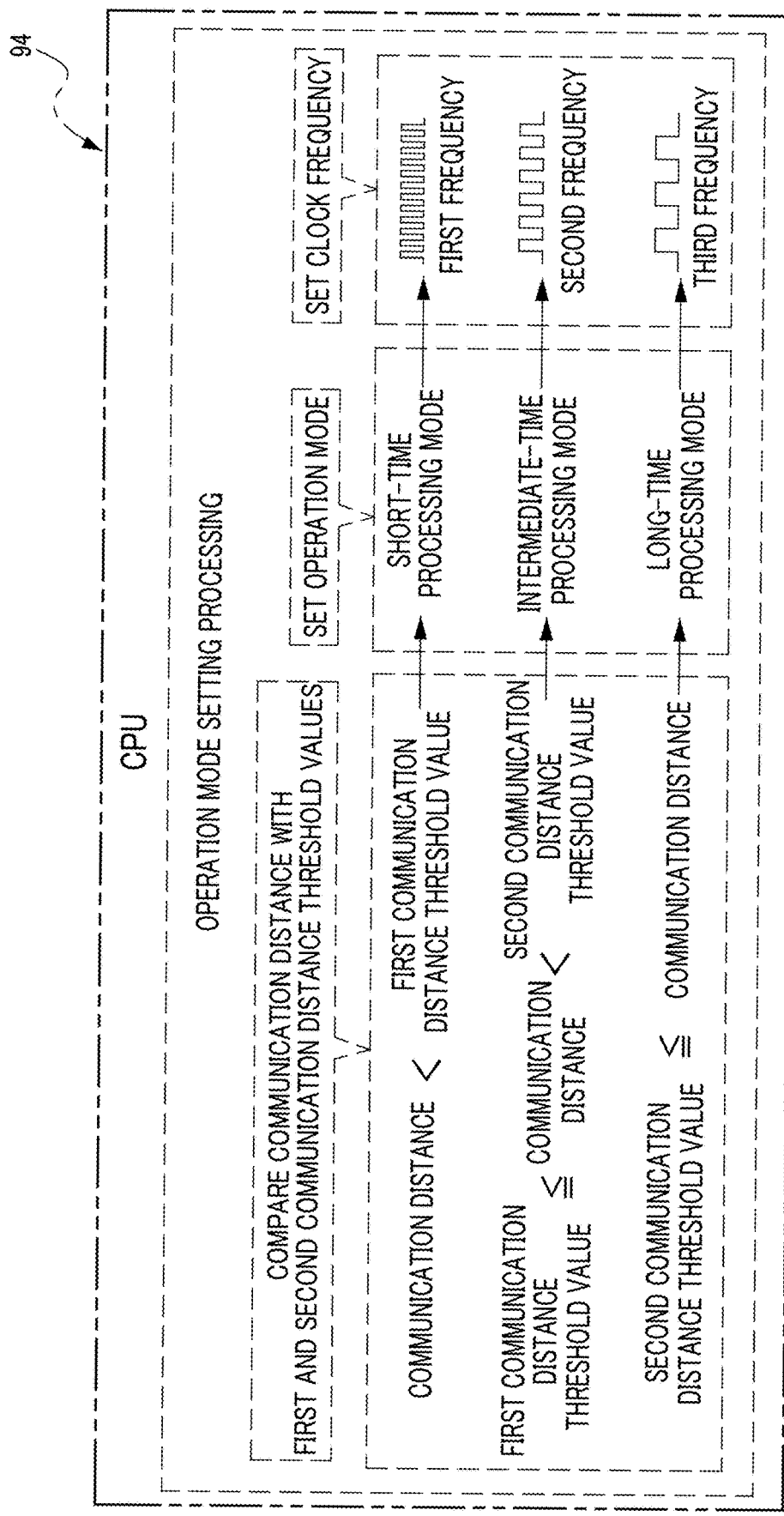
FIG. 21 is a conceptual diagram showing an example of processing contents of operation mode setting processing that is executed by a CPU of the cartridge memory in the magnetic tape cartridge according to the second embodiment.

As shown in FIG. 21, as an example, the CPU 94 compares the calculated communication distance D with a first communication distance threshold value and a second communication distance threshold value. The first communication distance threshold value, for example, is a value derived in advance by at least one of a test with a real machine, a computer simulation, or the like, as an upper limit value of the communication distance at which a magnetic field of a sufficient intensity causing no power shortage can be obtained, even if the read-out processing is executed in the short-time processing mode i.e. based on the clock signal of the first frequency on condition that the intensity of the magnetic field MF discharged from the noncontact reading and writing device 50 is kept constant. The second communication distance threshold value, for example, is a value derived in advance by at least one of a test with a real machine, a computer simulation, or the like, as an upper limit value of the communication distance at which a magnetic field of a sufficient intensity causing no power shortage can be obtained, even if the read-out processing is executed in the intermediate-time processing mode i.e. based on the clock signal of the second frequency on condition that the intensity of the magnetic field MF discharged from the noncontact reading and writing device 50 is kept constant. The first communication distance threshold value is smaller than the second communication distance threshold value.

In a case where the calculated communication distance D is less than the first communication distance threshold value, the CPU 94 sets the operation mode to the short-time processing mode. In a case where the calculated communication distance D is equal to or greater than the first communication distance threshold value and is less than the second communication distance threshold value, the CPU 94 sets the operation mode to the intermediate-time processing mode. In a case where the calculated communication distance D is equal to or greater than the second communication distance threshold value, the CPU 94 sets the operation mode to the long-time processing mode.

The CPU 94 executes processing corresponding to the command signal in the set operation mode. In other words, the CPU 94 executes the polling processing, the write-in processing, or the read-out processing at a processing speed corresponding to the communication distance D. The CPU 94 changes a response time corresponding to the command signal by changing the processing speed according to the communication distance D.

Next, the operation of the cartridge memory 19 according to the second embodiment will be described with reference to FIG. 22.

Figure 22:
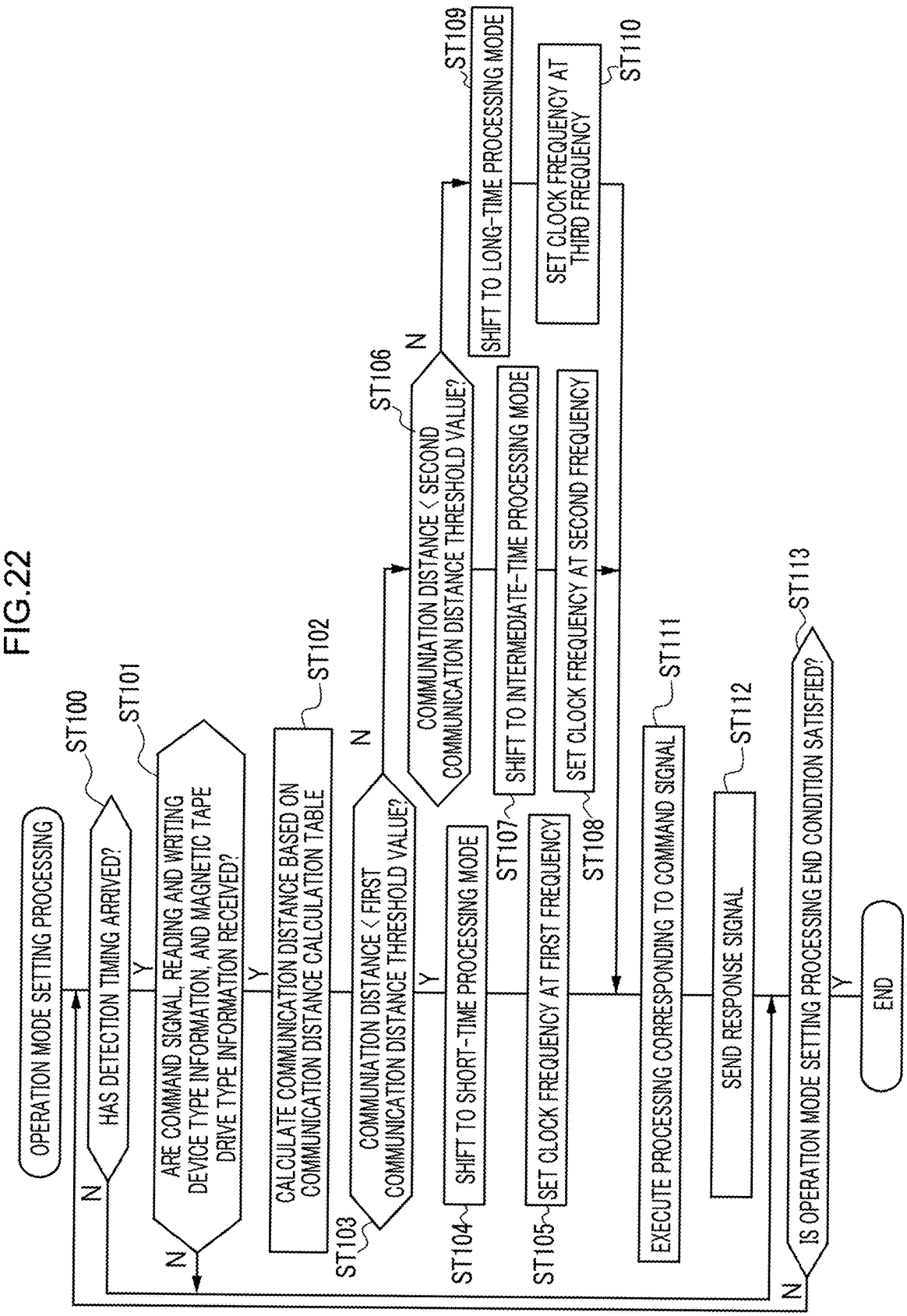
FIG. 22 is a flowchart showing an example of the flow of the operation mode setting processing according to the second embodiment.

In operation mode setting processing shown in FIG. 22, first, in Step ST100, the CPU 94 determines whether or not detection timing to detect reception of a signal including the command signal, the reading and writing device type information, and the magnetic tape drive type information has arrived. The detection timing is set every established time (for example, 0.5 seconds). In Step ST100, in a case where the detection timing has not arrived, the determination is in the negative, and the operation mode setting processing goes to Step ST113. In Step ST100, in a case where the detection timing has arrived, the determination is in the affirmative, and the operation mode setting processing goes to Step ST101.

In Step ST101, the CPU 94 determines whether or not the signal processing circuit 88 has received the command signal, the reading and writing device type information, and the magnetic tape drive type information. In Step ST101, in a case where the signal processing circuit 88 has not received the command signal, the reading and writing device type information, and the magnetic tape drive type information, the determination is in the negative, and the operation mode setting processing goes to Step ST113. In Step ST101, in a case where the signal processing circuit 88 has received the command signal, the reading and writing device type information, and the magnetic tape drive type information, the determination is in the affirmative, and the operation mode setting processing goes to Step ST102.

In Step ST102, the CPU 94 calculates a communication distance D using the received reading and writing device type information and magnetic tape drive type information, based on the communication distance calculation table 103. The operation mode setting processing thereafter goes to Step ST103

In Step ST103, the CPU 94 determines whether or not the communication distance D is less than the first communication distance threshold value. In Step ST103, in a case where the communication distance D is equal to or greater than the first communication distance threshold value, the determination is in the negative, and the operation mode setting processing goes to Step ST106. In Step ST103, in a case where the communication distance D is less than the first communication distance threshold value, the determination is in the affirmative, and the operation mode setting processing goes to Step ST104.

In Step ST104, the CPU 94 sets the operation mode to the short-time processing mode. The operation mode setting processing thereafter goes to Step ST105.

In Step ST105, the CPU 94 sets the clock frequency at the first frequency corresponding to the short-time processing mode. The operation mode setting processing thereafter goes to Step ST111.

In Step ST106, the CPU 94 determines whether or not the communication distance D is less than the second communication distance threshold value. In Step ST106, in a case where the communication distance D is equal to or greater than the second communication distance threshold value, the determination is in the negative, and the operation mode setting processing goes to Step ST109. In Step ST106, in a case where the communication distance D is less than the second communication distance threshold value (i.e. first communication distance threshold value communication distance D<second communication distance threshold value), the determination is in the affirmative, and the operation mode setting processing goes to Step ST107.

In Step ST107, the CPU 94 sets the operation mode to the intermediate-time processing mode. The operation mode setting processing thereafter goes to Step ST108.

In Step ST108, the CPU 94 sets the clock frequency at the second frequency corresponding to the intermediate-time processing mode. The operation mode setting processing thereafter goes to Step ST111.

In Step ST109, the CPU 94 sets the operation mode to the long-time processing mode. The operation mode setting processing thereafter goes to Step ST110.

In Step ST110, the CPU 94 sets the clock frequency at the third frequency corresponding to the long-time processing mode. The operation mode setting processing thereafter goes to Step ST111.

In Step ST111, the CPU 94 executes processing corresponding to the command signal received in Step ST101 by the signal processing circuit 88. The operation mode setting processing thereafter goes to Step ST112.

In Step ST112, the CPU 94 controls the signal processing circuit 88 and the resonance circuit 92 to send a response signal, which indicates a processing result obtained by the processing of Step ST111, to the noncontact reading and writing device 50 through the magnetic field MF. The operation mode setting processing thereafter goes to Step ST113.

In Step ST113, the CPU 94 determines whether or not a condition (hereinafter, referred to as an "operation mode setting processing end condition") for ending the operation mode setting processing is satisfied. As the operation mode setting processing end condition, for example, there is a condition that the magnetic field MF has disappeared. The CPU 94 determines whether or not the magnetic field MF has disappeared, based on a magnetic field intensity signal inputted from the magnetic field intensity measurement circuit 90 to the CPU 94. In Step ST113, in a case where the operation mode setting processing end condition is not satisfied, the determination is in the negative, and the operation mode setting processing goes to Step ST100. In Step ST113, in a case where the operation mode setting processing end condition is satisfied, the determination is in the affirmative, and the operation mode setting processing ends.

As described above, according to the second embodiment, the CPU 94 changes the response time corresponding to the command signal, according to the communication distance D that is derived from the characteristics of the magnetic tape cartridge 10 and the noncontact reading and writing device 50. Therefore, according to this configuration, it is possible to realize both stabilization of the operation and improvement in the processing speed of the cartridge memory 19, as compared with the case of setting the response time irrespective of the communication distance D.

The second embodiment explains, by way of example, the case of changing the response time according to the communication distance D, but the technique of the present disclosure is not limited thereto. For example, the CPU 94 may set the operation mode in the short-time processing mode in advance, and change the operation mode to the intermediate-time processing mode or the long-time processing mode according to the communication distance D. In other words, the CPU 94 may make the response time longer than a time predetermined as a standard response time, according to the communication distance D. According to this configuration, it is possible to realize both stabilization of operation and reduction in power consumption of the cartridge memory 19.

Third Embodiment

The above-described second embodiment explains, by way of example, the case of changing the operation mode of the cartridge memory 19 according to the communication distance D, but this third embodiment explains, by way of example, the case of changing the operation mode according to an available storage capacity set for the NVM 96 (hereinafter also referred to as "available storage capacity"). In the third embodiment, elements that are the same as or identical to the elements described in the above-described first and second embodiment are indicated with the same reference numerals, and the description thereof is omitted.

Figure 23:
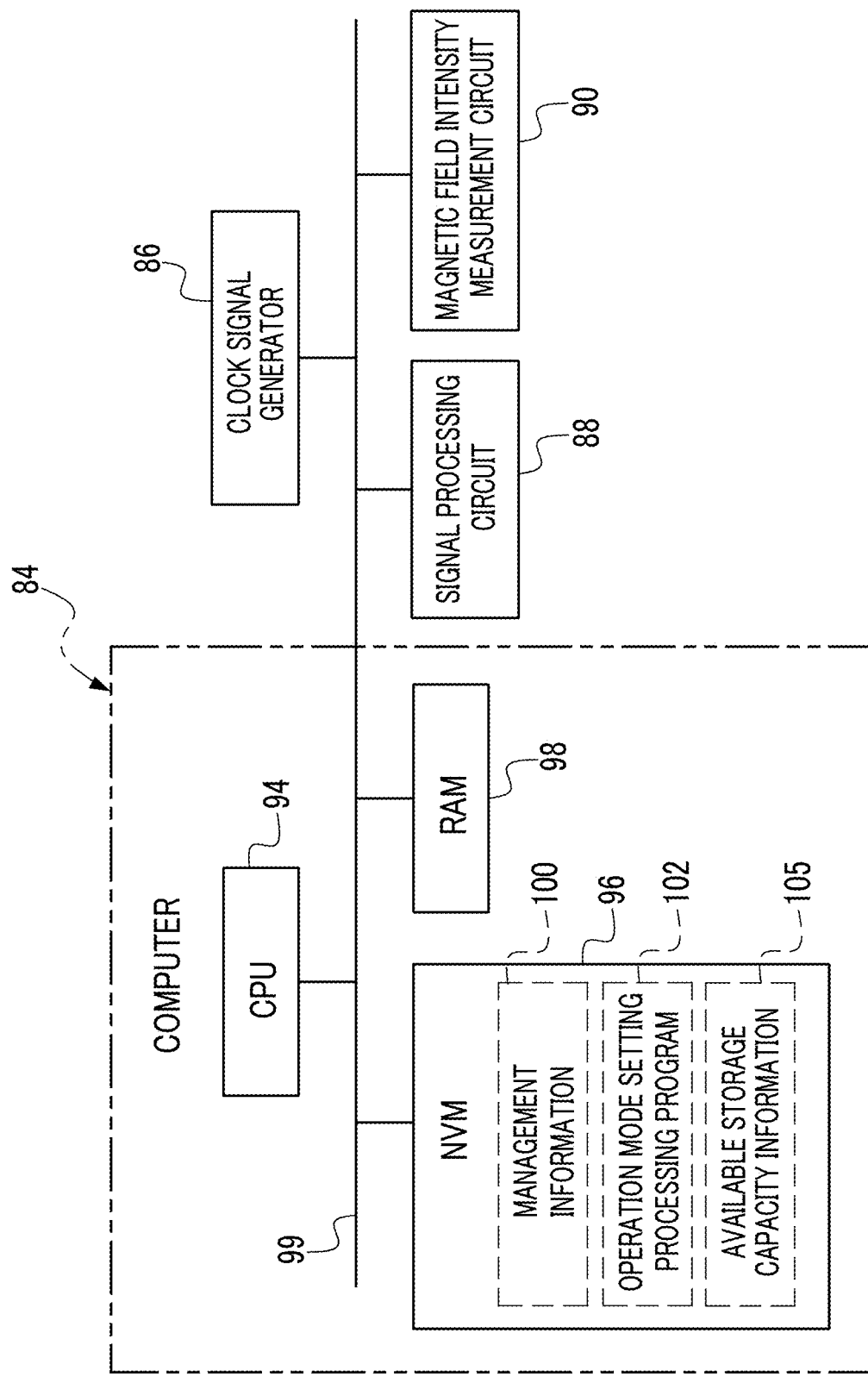
FIG. 23 is a block diagram showing an example of the hardware configuration of a computer of an IC chip that is mounted on a cartridge memory in a magnetic tape cartridge according to a third embodiment.

As shown in FIG. 23, as an example, the NVM 96 stores available storage capacity information 105, which indicates information relating to the available storage capacity. The available storage capacity of the NVM 96 is set at, for example, a fraction of the total storage capacity of the NVM 96. This is because memory cells contained in the NVM 96 tend to degrade earlier than a product lifetime of the magnetic tape MT. Setting the available storage capacity of the NVM 96 at a friction of the total storage capacity makes it possible to elongate a product lifetime of the NVM 96 by, for example, replacing memory cells that have degraded and become unusable with unused memory cells. The available storage capacity is an example of "a characteristic of a noncontact communication medium" according to the technique of the present disclosure.

Figure 24:
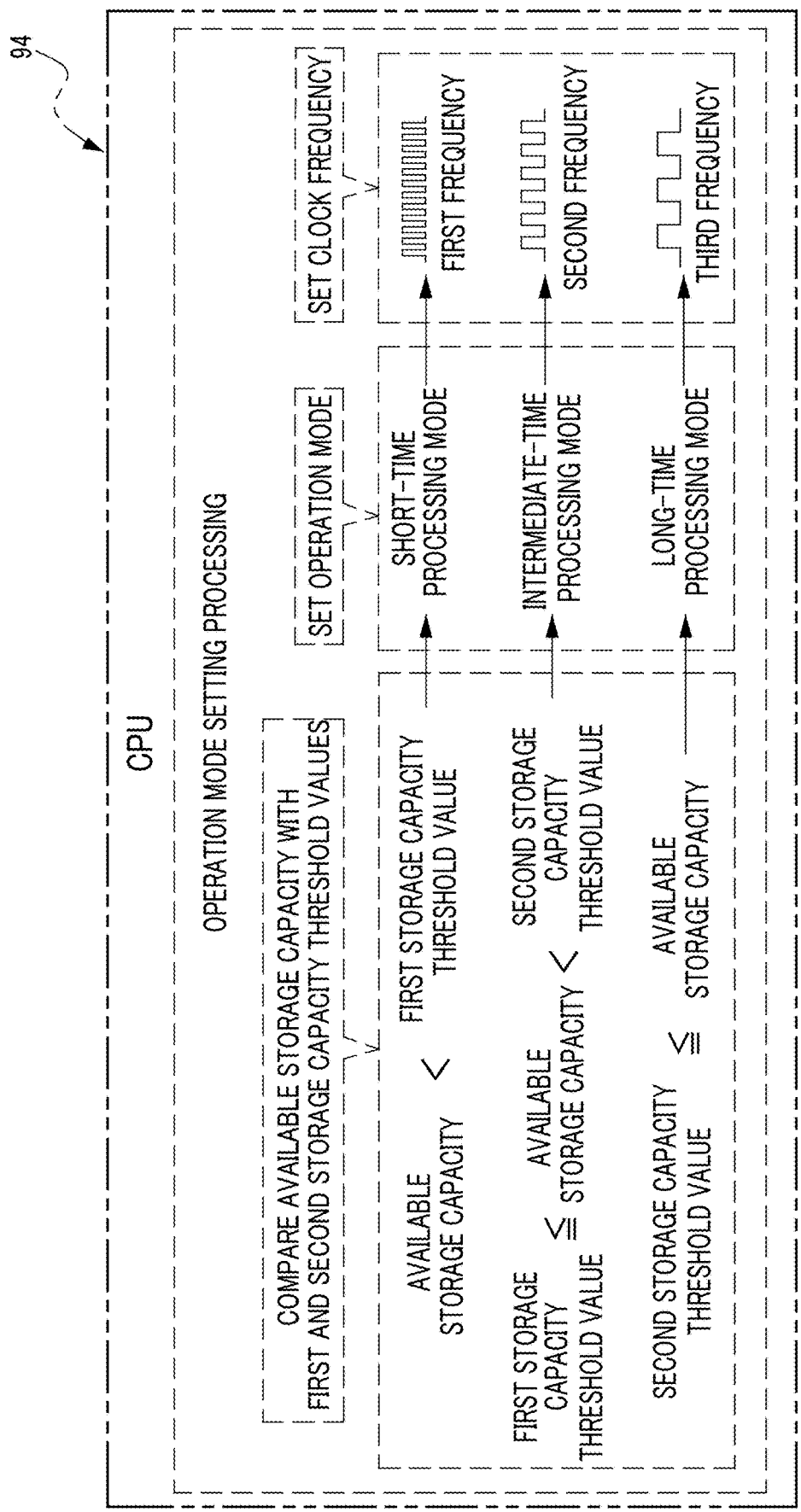
FIG. 24 is a conceptual diagram showing an example of processing contents of operation mode setting processing that is executed by a CPU of the cartridge memory in the magnetic tape cartridge according to a third embodiment.

As shown in FIG. 24, as an example, the CPU 94 reads the available storage capacity information 105 from the NVM 96, and compares the available storage capacity indicated by the available storage capacity information 105 with a first storage capacity threshold value and a second storage capacity threshold value. The first storage capacity threshold value, for example, is a value derived in advance by at least one of a test with a real machine, a computer simulation, or the like, as an upper limit value of the available storage capacity causing no power shortage, even if the read-out processing is executed in the short-time processing mode i.e. based on the clock signal of the first frequency. The second storage capacity threshold value, for example, is a value derived in advance by at least one of a test with a real machine, a computer simulation, or the like, as an upper limit value of the available storage capacity causing no power shortage, even if the read-out processing is executed in the intermediate-time processing mode i.e. based on the clock signal of the second frequency. The first storage capacity threshold value is smaller than the second storage capacity threshold value.

In a case where the available storage capacity indicated by the available storage capacity information 105 is less than the first storage capacity threshold value, the CPU 94 sets the operation mode to the short-time processing mode. In a case where the available storage capacity indicated by the available storage capacity information 105 is equal to or greater than the first storage capacity threshold value and is less than the second storage capacity threshold value, the CPU 94 sets the operation mode to the intermediate-time processing mode. In a case where the available storage capacity indicated by the available storage capacity information 105 is greater than the second storage capacity threshold value, the CPU 94 sets the operation mode to the long-time processing mode.

The CPU 94 executes processing corresponding to a command signal in the set operation mode. In other words, the CPU 94 executes the polling processing, the write-in processing, or the read-out processing at a processing speed corresponding to the available storage capacity. The CPU 94 changes a response time corresponding to the command signal by changing the processing speed according to the available storage capacity.

As described above, according to the third embodiment, the CPU 94 changes the response time according to the available storage capacity set for the NVM 96. Therefore, according to this configuration, it is possible to realize both stabilization of the operation and improvement in the processing speed of the cartridge memory 19, as compared with the case of setting the response time irrespective of available storage capacity.

Fourth Embodiment

The above-described third embodiment explains, by way of example, the case of changing the operation mode according to the available storage capacity, but this fourth embodiment explains, by way of example, a case in which the cartridge memory 19 can carry out communication with the selective use of a plurality of communication standards, and a response time is changed according to the used communication standard. In the fourth embodiment, elements that are the same as or identical to the elements described in the above-described first to third embodiment are indicated with the same reference numerals, and the description thereof is omitted.

In the fourth embodiment, the cartridge memory 19 is in conformity with the plurality of communications standards. The CPU 94 communicates with the noncontact reading and writing device 50 with the selective use of the plurality of communications standards. As the communications standards used in radio communication between the cartridge memory 19 and the noncontact reading and writing device 50, there are, for example, ISO18092, ISO14443A, ISO14443B, ISO15693, and the like.

Figure 25:
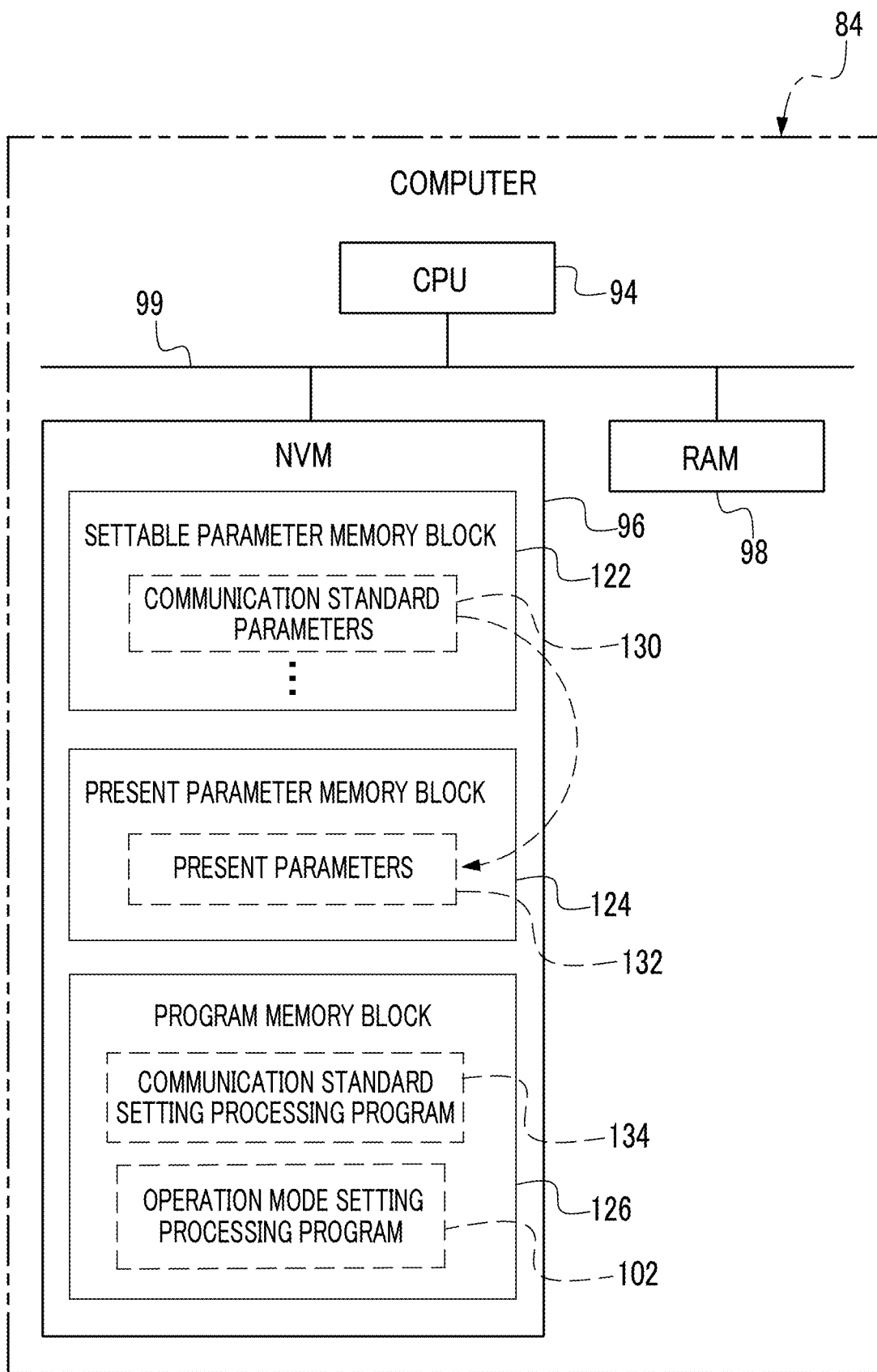
FIG. 25 is a block diagram showing an example of the hardware configuration of a computer of an IC chip that is mounted on a cartridge memory in a magnetic tape cartridge according to a fourth embodiment.

As shown in FIG. 25, as an example, the NVM 96 has a plurality of memory blocks, including a settable parameter memory block 122, a present parameter memory block 124, and a program memory block 126. In the plurality of memory blocks, the management information 100 (see FIG. 10) and the like are stored.

The settable parameter memory block 122 stores a plurality of types of communication standard parameters 130 that can identify the communication standards settable in the IC chip 52. The present parameter memory block 124 stores present parameters 132. The present parameters 132 are one of the plurality of types of communication standard parameters 130 corresponding to the communication standard that is presently set in the IC chip 52.

The program memory block 126 stores a communication standard setting processing program 134, in addition to the operation mode setting processing program 102.

A communication standard identified by the present parameters 132 stored in the present parameter memory block 124 is a communication standard that is presently set in the IC chip 52. The CPU 94 changes the response time according to the present parameters 132 stored in the present parameter memory block 124.

Figure 26:
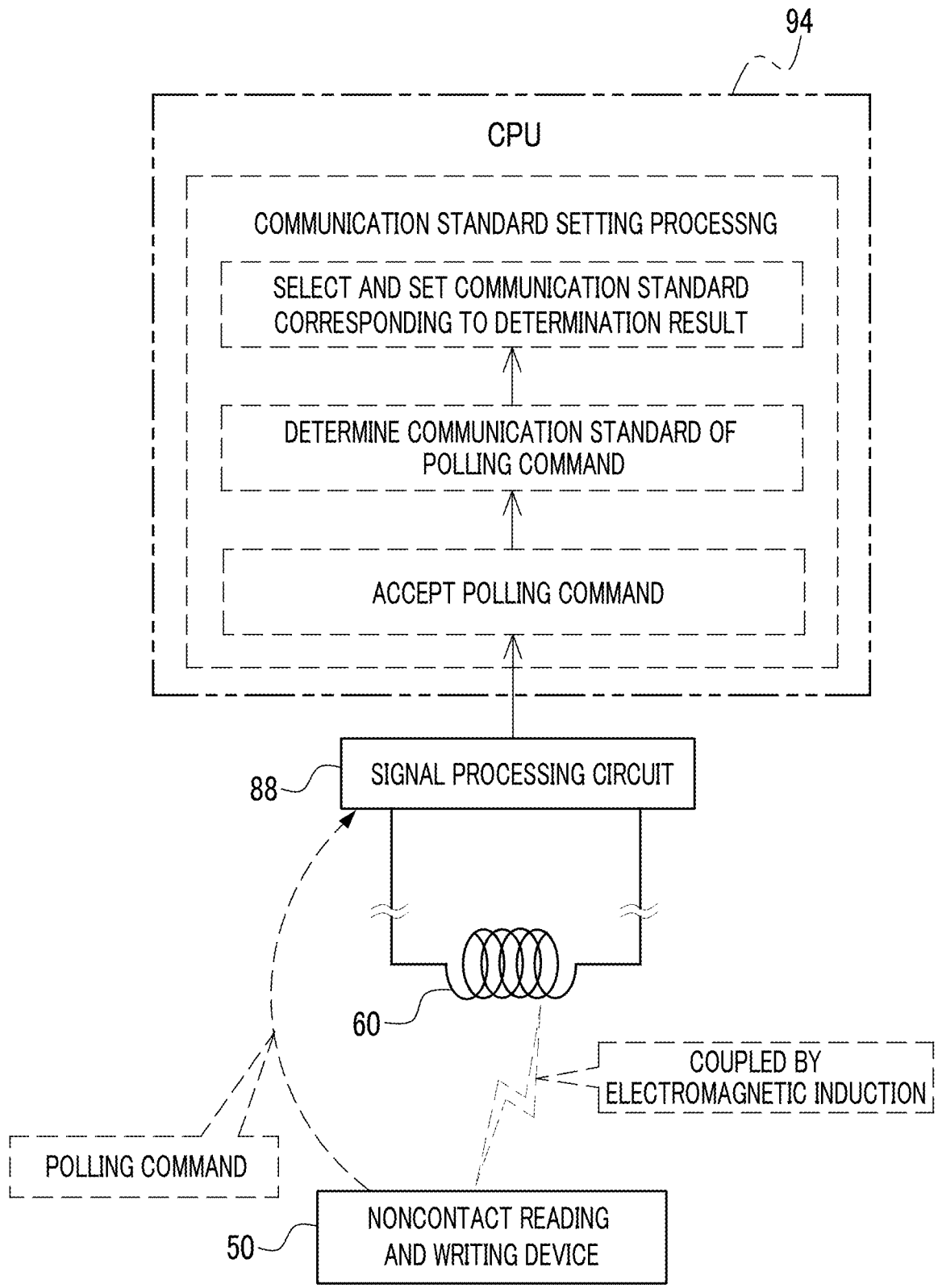
FIG. 26 is a block diagram showing an example of processing contents of a noncontact reading and writing device and a CPU according to the fourth embodiment.

As shown in FIG. 26, as an example, the noncontact reading and writing device 50 is in conformity with a plurality of communication standards. The noncontact reading and writing device 50 communicates with the cartridge memory 19 with the use of one of the plurality of communication standards that is available to the cartridge memory 19. The communication standard used in the communication between the noncontact reading and writing device 50 and the cartridge memory 19 is an example of "a characteristic of a noncontact communication medium" and "a characteristic of a communicatee" according to the technique of the present disclosure.

As shown in FIG. 26, as an example, the noncontact reading and writing device 50 is coupled to the coil 60 by electromagnetic induction by application of a magnetic field MF (see FIGS. 5 and 6) to the coil 60. In a state of coupling between the noncontact reading and writing device 50 and the coil 60 by the electromagnetic induction, the noncontact reading and writing device 50 sends a polling command to the signal processing circuit 88. The signal processing circuit 88 receives the polling command from the noncontact reading and writing device 50 through the coil 60. The signal processing circuit 88 sends the received polling command to the CPU 94.

The CPU 94 receives the polling command from the signal processing circuit 88, and determines a communication standard of the received polling command. The CPU 94 selects and sets the communication standard corresponding to a determination result, out of the plurality of communication standards.

Figure 27:
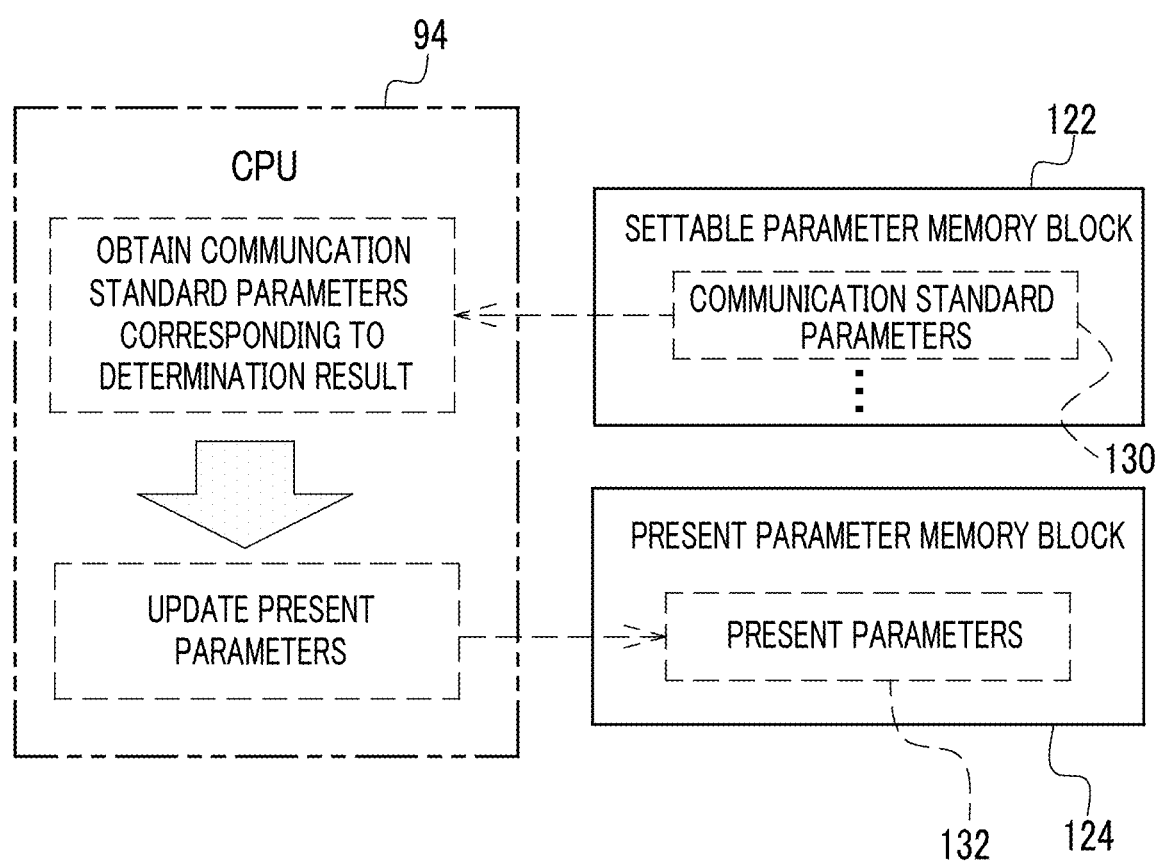
FIG. 27 is a block diagram showing an example of processing contents of the CPU according to the fourth embodiment.

As shown in FIG. 27, as an example, the CPU 94 obtains, from the settable parameter memory block 122, one of the plurality of types of communication standard parameters 130 that corresponds to the communication standard corresponding to the determination result. The CPU 94 writes and saves the communication standard parameters 130 obtained from the settable parameter memory block 122 in the present parameter memory block 124, in order to update the present parameters 132 in the present parameter memory block 124. In other words, CPU 94 rewrites the present parameters 132 into the present parameter memory block 124 to update the present parameters 132 in the present parameter memory block 124.

The communication standard identified by the present parameters 132 stored in the present parameter memory block 124 is a communication standard that is presently set in the IC chip 52. The CPU 94 identifies the presently set communication standard based on the present parameters 132, and changes the operation mode according to the identified communication standard.

Figure 28:
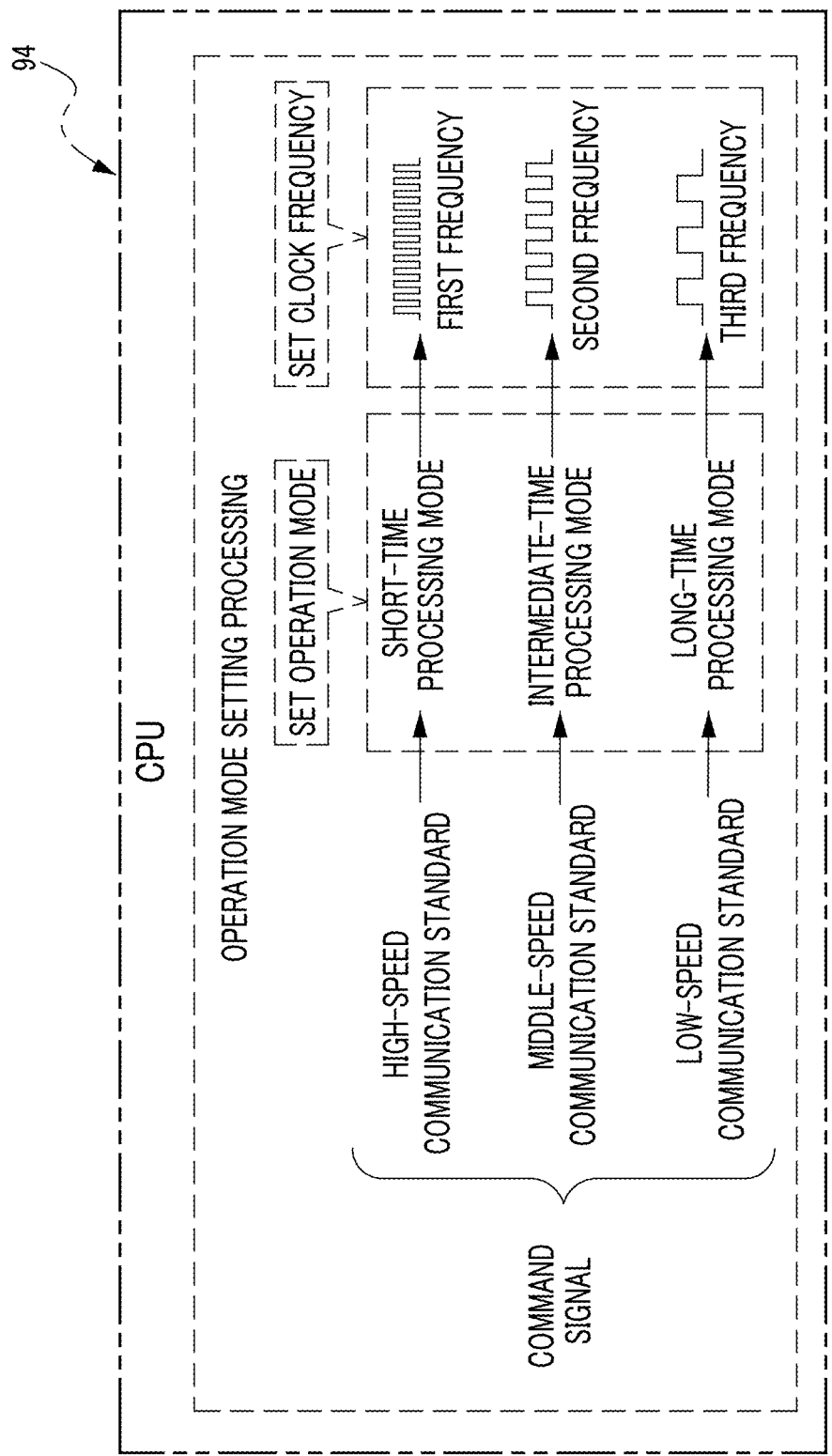
FIG. 28 is a conceptual diagram showing an example of processing contents of operation mode setting processing executed by the CPU of the cartridge memory in the magnetic tape cartridge according to the fourth embodiment.

As shown in FIG. 28, as an example, in a case where the presently set communication standard is a high-speed communication standard, the CPU 94 sets the operation mode to the short-time processing mode. In a case where the presently set communication standard is a middle-speed communication standard, the CPU 94 sets the operation mode to the intermediate-time processing mode. In a case where the presently set communication standard is a low-speed communication standard, the CPU 94 sets the operation mode to the long-time processing mode.

The CPU 94 executes processing corresponding to a command signal in the set operation mode. In other words, the CPU 94 executes the polling processing, the write-in processing, or the read-out processing at a processing speed corresponding to the presently set communication standard. The CPU 94 changes a response time corresponding to the command signal by changing the processing speed according to the presently set communication standard.

As described above, according to the fourth embodiment, the cartridge memory 19 is in conformity with the plurality of communication standards. The CPU 94 carries out communication with the selective use of the plurality of communication standards, and changes the response time according to the communication standard used in the communication. Therefore, according to this configuration, it is possible to realize both stabilization of the operation and improvement in the processing speed of the cartridge memory 19, as compared with the case of setting the response time irrespective of the presently set communication standard.

The noncontact reading and writing device 50 can carry out communication by each of the plurality of communication standards. The CPU 94 changes the response time according to the communication standard corresponding to the cartridge memory 19, out of the plurality of communication standards. Therefore, according to this configuration, it is possible to improve flexibility in choice of the communication standard, as compared with a case in which only one communication standard is available.

Figure 29:
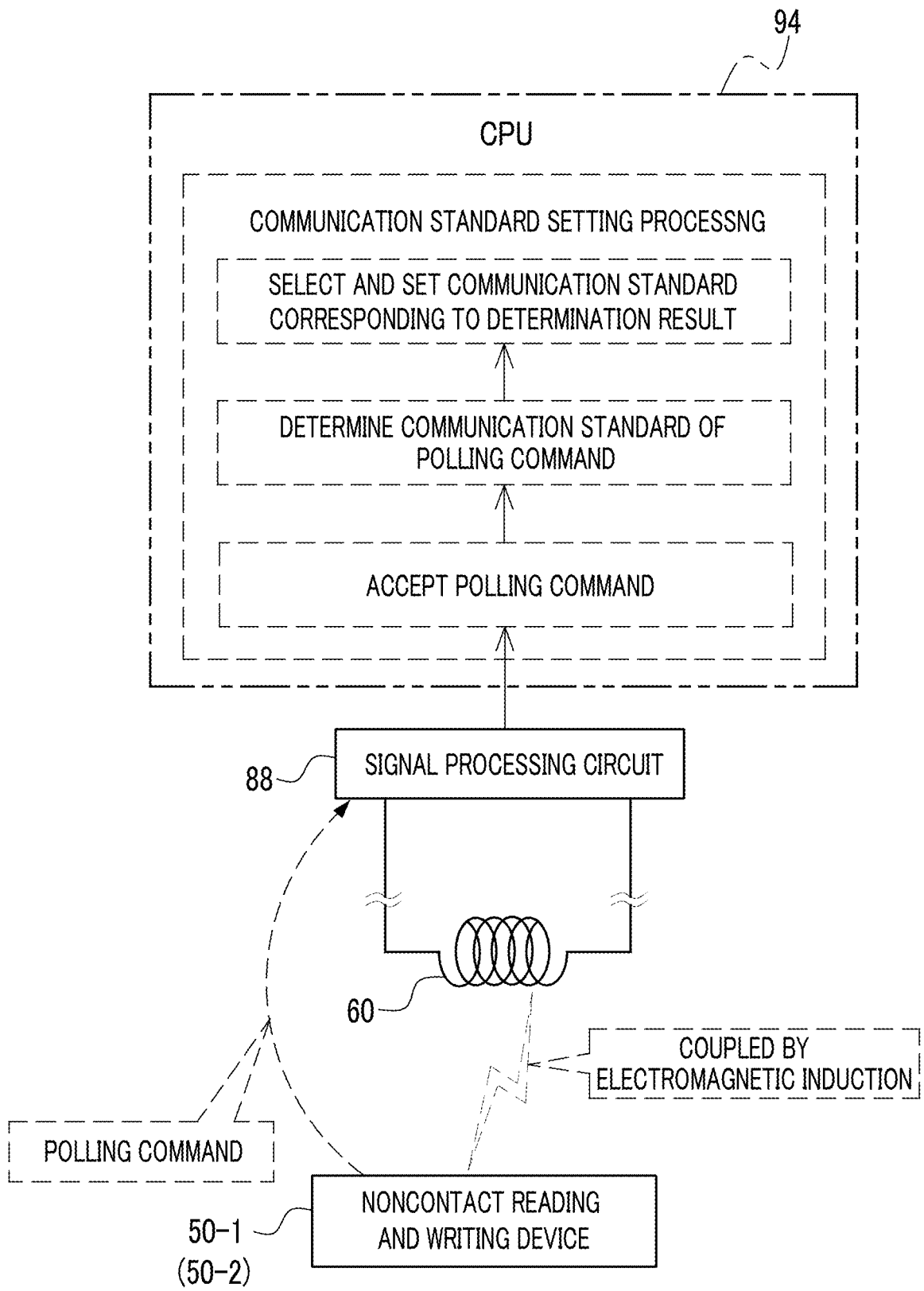
FIG. 29 is a block diagram showing an example of processing contents of the noncontact reading and writing device and the CPU according to a modification example of the fourth embodiment.

The fourth embodiment explains, by way of example, a case where the single noncontact reading and writing device 50 is in conformity with the plurality of communication standards, but the technique of the present disclosure is not limited thereto. For example, as shown in FIG. 29, the technique of the present disclosure may be applied to a case in which a plurality of noncontact reading and writing devices 50-1 and 50-2 that are in conformity with different communication standards, respectively, communicate with the same cartridge memory 19. In other words, the CPU 94 may change the response time according to the communication standard adopted in used one of the plurality of noncontact reading and writing devices 50-1 and 50-2. According to this configuration, it is possible to provide the versatile cartridge memory 19 that can adopt the plurality of communication standards adopted by the plurality of noncontact reading and writing devices 50-1 and 50-2.

Figure 30:
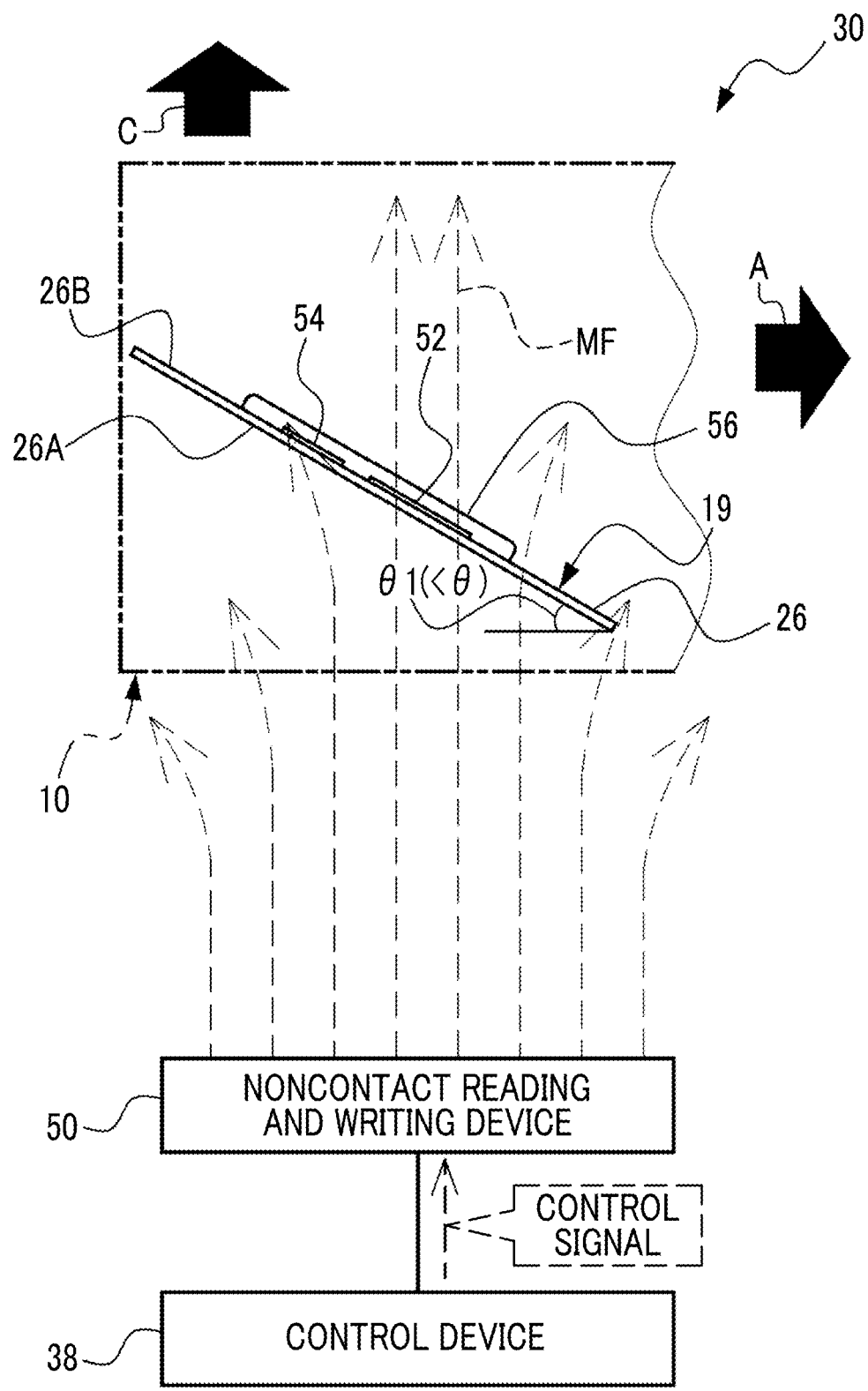
FIG. 30 is a conceptual diagram showing a modification example of an inclination angle of the cartridge memory in the magnetic tape cartridge according to the first and second embodiments.

In each of the above-described embodiments, although 45 degrees have been exemplified as the inclination angle θ, the technique of the present disclosure is not limited thereto. As an example, as shown in FIG. 30, an inclination angle θ1 smaller than the inclination angle θ may be employed as the inclination angle with respect to the reference surface 16A1 of the cartridge memory 19. An example of the inclination angle θ1 is 30 degrees. Since the inclination angle θ1 is an angle smaller than the inclination angle θ, it is possible to let many lines of magnetic force pass through the coil 60 (see FIG. 7), as compared to the case of the inclination angle θ. As a result, the coil 60 can obtain a large induced current in a state in which the magnetic tape cartridge 10 is loaded into the magnetic tape drive 30, as compared to the case of the inclination angle θ.

Figure 31:
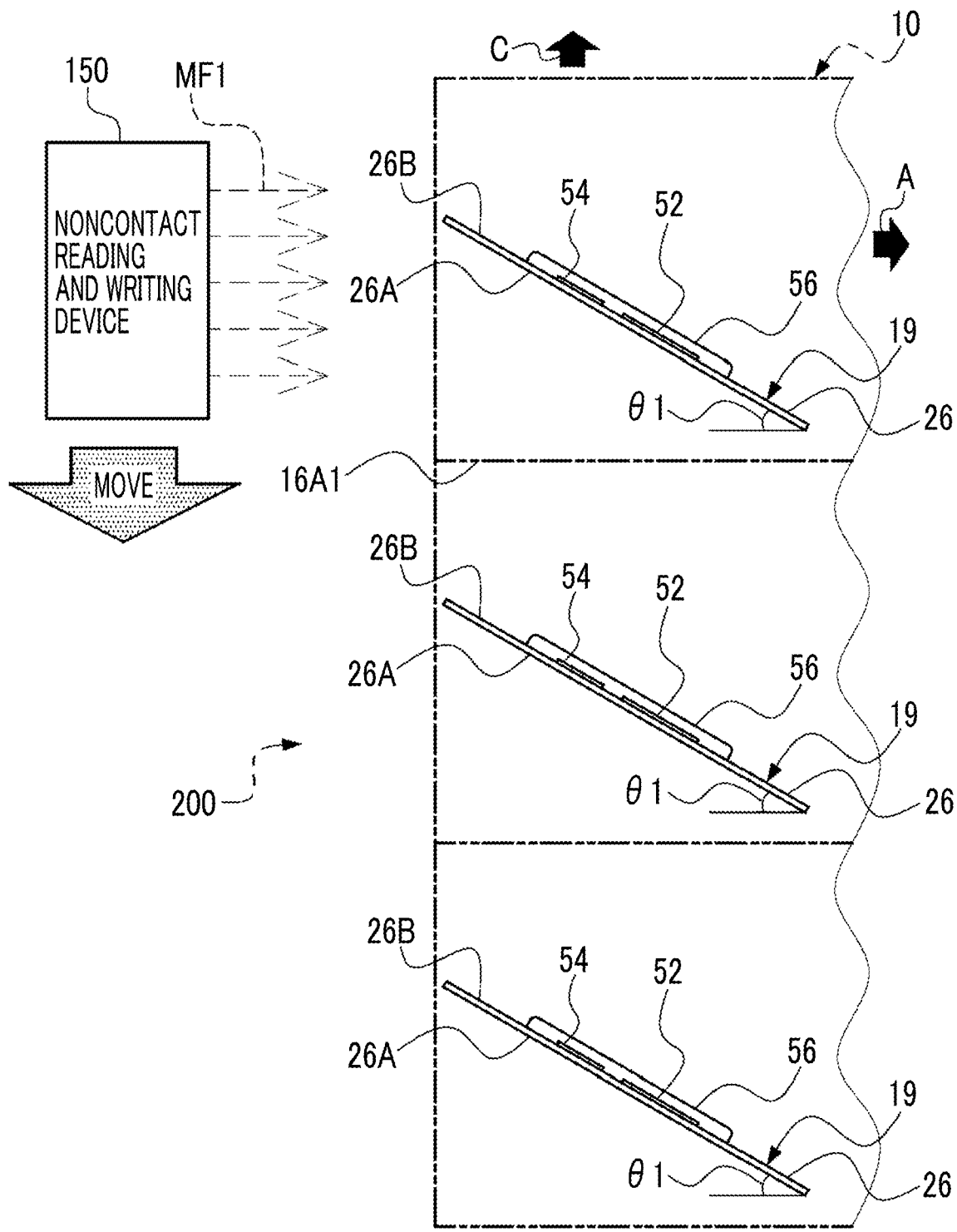
FIG. 31 is a conceptual diagram showing an example of an aspect in which a magnetic field is applied to a package of a plurality of magnetic tape cartridges according to the first and second embodiments.

As an example, as shown in FIG. 31, in at least one of a production process of the magnetic tape cartridge 10, a management process of the magnetic tape cartridge 10, or a distribution process (for example, a distribution process in a market) in which the magnetic tape cartridge 10 is distributed, reading and writing of the management information 100 and the like are performed by a noncontact reading and writing device 150 from and to the cartridge memory 19 of each magnetic tape cartridge 10 in a package 200 in which a plurality of magnetic tape cartridges 10 stacked in an up-down direction are bound by a plastic film. Reading and writing of the management information 100 and the like from and to the cartridge memory 19 by the noncontact reading and writing device 150 are performed on a rear side of the magnetic tape cartridge 10 while moving the noncontact reading and writing device 150 along a direction in which a plurality of magnetic tape cartridges 10 are stacked. In this case, for example, the noncontact reading and writing device 150 sequentially emits the magnetic field MF1 to the respective magnetic tape cartridges 10 while repeating the on and off of the magnetic field MF1.

Incidentally, under an environment (under a first environment) that the magnetic tape cartridge 10 is loaded into the magnetic tape drive 30, the magnetic field MF (first magnetic field) is applied from a side confronting the reference surface 16A1 toward the back surface 26A (coil forming surface) of the substrate 26, on which the coil 60 is formed, from the lower direction or the upper direction of the magnetic tape cartridge 10 by the noncontact reading and writing device 50 (see FIG. 30). Therefore, many lines of magnetic force pass through the coil 60 and a large induced current is obtained, as compared to a case where the inclination angle of the cartridge memory 19 is the inclination angle θ.

In contrast, under an environment (under a second environment) of at least one of the production process, the management process, or the distribution process, as an example, as shown in FIG. 31, a plurality of magnetic tape cartridges 10 are handled as the package 200. In this case, a magnetic field MF1 (second magnetic field) is applied from a side crossing a normal direction of the reference surface 16A1 and confronting the back surface 26A toward the back surface 26A. Therefore, it is possible to prevent reading and writing of the management information 100 and the like from and to the unintended magnetic tape cartridge 10 in the package 200 (the occurrence of crosstalk), as compared to a case where the inclination angle of the cartridge memory 19 is the inclination angle θ.

In the example shown in FIG. 31, although an aspect where the noncontact reading and writing device 150 is moved along the up-down direction with respect to the package 200 in a case where the noncontact reading and writing device 150 performs communication with each cartridge memory 19 in the package 200 through the magnetic field MF1 has been exemplified, this aspect is merely an example, and the position of the noncontact reading and writing device 150 may be fixed and the package 200 may be moved along the up-down direction. The noncontact reading and writing device 150 and the package 200 may be moved in opposite directions in the up-down direction. In this way, in a case where the noncontact reading and writing device 150 performs communication with each cartridge memory 19 in the package 200 through the magnetic field MF1, the noncontact reading and writing device 150 may be relatively moved along the up-down direction with respect to the package 200.

In a case of performing reading and writing of the management information 100 and the like from and to the cartridge memory 19, the noncontact reading and writing device 150 emits the magnetic field MF1 from a rear side of the magnetic tape cartridge 10 toward the cartridge memory 19. The power generator 70 of the cartridge memory 19 generates power with application of the magnetic field MF1 to the coil 60 of the cartridge memory 19. Then, the noncontact reading and writing device 150 transmits the command signal to the cartridge memory 19 through the magnetic field MF1. The cartridge memory 19 executes the processing according to the command signal using power generated by the power generator 70 and transmits the processing result as the response signal to the noncontact reading and writing device 150. That is, various types of information are transferred between the noncontact reading and writing device 150 and the cartridge memory 19 through the magnetic field MF1.

To the cartridge memory 19 (hereinafter, referred to as a "reading and writing target cartridge memory" without attaching reference numeral) of one magnetic tape cartridge 10 (hereinafter, referred to as a "single cartridge" without attaching reference numeral) included in the package 200, the magnetic field MF1 is applied by the noncontact reading and writing device 150 from the rear side of the single cartridge toward the reading and writing target cartridge memory. However, in the case of the inclination angle θ, there is a concern that the magnetic field MF1 is applied to the cartridge memory 19 of the magnetic tape cartridge 10

(hereinafter, referred to as an "adjacent cartridge") adjacent to a single cartridge in the package 200 according to the directivity of the magnetic field MF1, and reading and writing of the management information 100 and the like are performed from and to the cartridge memory 19 of the adjacent cartridge. In other words, reading and writing of the management information 100 and the like from and to the cartridge memory 19 of the adjacent cartridge means the occurrence of crosstalk.

Here, in a case where the inclination angle $θ1$ is set, it is possible to make the number of lines of magnetic force passing through the coil 60 of the cartridge memory 19 smaller than the inclination angle $θ$, and the magnetic field MF1 is hardly applied to the cartridge memory 19 of the adjacent cartridge as compared to the inclination angle $θ$. As a result, in a case where the inclination angle $θ1$ is set, it is possible to prevent erroneous reading and writing of the management information 100 and the like from and to the magnetic tape cartridge 10, that is, the occurrence of crosstalk as compared to the inclination angle $θ$. As a result, for example, in the production process of the magnetic tape cartridge 10, it is possible to improve the productivity of the magnetic tape cartridge 10 without increasing equipment cost. In the management process of the magnetic tape cartridge 10, it is possible to improve the efficiency of the management of the magnetic tape cartridge 10 without increasing equipment cost.

In the example shown in FIG. 10, although an aspect where the operation mode setting processing program 102 is stored in the NVM 96 has been exemplified, the technique of the present disclosure is not limited thereto. For example, as shown in FIG. 20, the operation mode setting processing program 102 may be stored in a storage medium 300. The storage medium 300 is a non-transitory storage medium. An example of the storage medium 300 is any portable storage medium, such as an SSD or a USB memory.

The operation mode setting processing program 102 stored in the storage medium 300 is installed on the computer 84. The CPU 94 executes the operation mode setting processing in accordance with the operation mode setting processing program 102. In an example shown in FIG. 32, the CPU 94 is a single CPU, but may be a plurality of CPUs.

Alternatively, the operation mode setting processing program 102 may be stored in a storage unit of another computer, a server device, or the like connected to the computer 84 through a communication network (not shown), and the operation mode setting processing program 102 may be downloaded according to a request from the cartridge memory 19 and installed on the computer 84.

Figure 32:
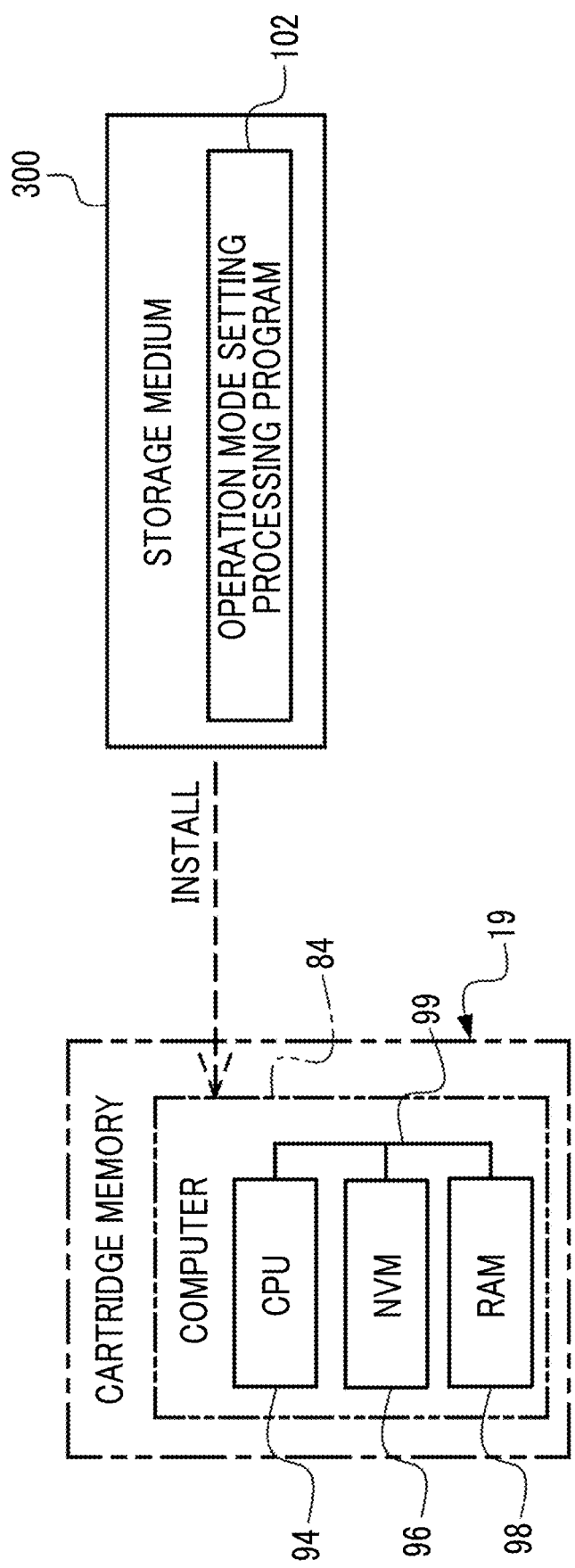
FIG. 32 is a block diagram showing an example of an aspect in which an operation mode setting processing program is installed on the computer from a storage medium storing the operation mode setting processing program according to the first and second embodiments.

In the example shown in FIG. 32, although the computer 84 has been illustrated, the technique of the present disclosure is not limited thereto, and a device including at least one of an ASIC, an FPGA, or a PLD may be applied instead of the computer 84. Alternatively, a combination of a hardware configuration and a software configuration may be used instead of the computer 84.

As a hardware resource that executes the operation mode setting processing, various processors described below can be used. Examples of the processors include a CPU that is a general-use processor executing software, that is, a program to function as a hardware resource executing the operation mode setting processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the operation mode setting processing.

The hardware resource executing the operation mode setting processing may be configured of one of various processors or may be configured of a combination of two or more processors (for example, a combination of a plurality of FPGAs or a combination of a CPU and an FPGA) of the same type or different types. Alternatively, the hardware resource executing the operation mode setting processing may be one processor.

As an example where the hardware resource is configured of one processor, first, there is a form in which one processor is configured of a combination of one or more CPUs and software, and the processor functions as the hardware resource executing the operation mode setting processing. Second, as represented by SoC or the like, there is a form in which a processor that realizes the function of the entire system including a plurality of hardware resources executing the operation mode setting processing with one IC chip is used. In this way, the operation mode setting processing is realized using one or more of various processors as the hardware resource.

In addition, as the hardware structures of various processors, more specifically, an electric circuit into which circuit elements, such as semiconductor elements, are combined can be used. The above-described operation mode setting processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

In regard to the above embodiment, the following appendixes are further disclosed.

Appendix 1

A noncontact management method that performs communication with a noncontact communication medium through an external magnetic field applied from an external device to manage a magnetic tape cartridge, in which the noncontact communication medium is housed, the noncontact communication medium including a substrate, on which a coil is formed, a power generator that generates power with application of the external magnetic field to the coil, and a processor that executes processing on a command included in the external magnetic field using the power generated by the power generator, and the external magnetic field being applied from the external device to the noncontact communication medium in the magnetic tape cartridge, on which a reference plane is formed, the noncontact management method comprising:

disposing the substrate to be inclined at an angle less than 45 degrees with respect to the reference plane, applying a first magnetic field as the external magnetic field from a side confronting the reference plane toward a coil forming surface of the substrate, on which the coil is formed, under a first environment that the magnetic tape cartridge is loaded into the magnetic tape drive, and applying a second magnetic field as the external magnetic field from a side crossing a normal direction of the reference plane and confronting the coil forming surface toward the coil forming surface under a second environment that the magnetic tape cartridge is present outside the magnetic tape drive.

Appendix 2

The noncontact management method according to Appendix 1, in which the second environment is at least one of a production process of the magnetic tape cartridge, a management process of the magnetic tape cartridge, or a distribution process in which the magnetic tape cartridge is distributed.

Appendix 3

The noncontact management method according to Appendix 1 or Appendix 2, in which each of the production process, the management process, and the distribution process includes a process of applying the second magnetic field to the noncontact communication medium in a package in which a plurality of the magnetic tape cartridges are stacked in the normal direction.

Appendix 4

The noncontact management method according to Appendix 3, in which the external device applies the external magnetic field to the coil forming surface of the noncontact communication medium of each of the plurality of magnetic tape cartridges while moving along the normal direction.

Explanation of References

What is claimed is:

1. A noncontact communication medium comprising:
a coil; and
a processor mounted on a magnetic tape cartridge, the processor communicating with a communicatee by coupling between the coil and the communicatee by electromagnetic induction through an external magnetic field applied from the communicatee, the communicatee merging a command into the external magnetic field, the processor executing processing corresponding to the command merged into the external magnetic field,
wherein the processor changes a response time of the processor in response to the command, according to a characteristic of at least one of the magnetic tape cartridge, the noncontact communication medium, or the communicatee.

2. The noncontact communication medium according to claim 1, further comprising:

a first memory storing first information, the processor executing at least one of reading or writing of the first information from and into the first memory, wherein
wherein the processor changes the response time according to an available storage capacity set in the first memory.

3. The noncontact communication medium according to claim 1, wherein:
the noncontact communication medium is in conformity with a plurality of communication standards,
the processor carries out communication with selective use of the plurality of communication standards, and
the processor changes the response time according to one of the plurality of communication standards used in the communication.

4. The noncontact communication medium according to claim 1, wherein:
the communicatee is able to carry out communication by each of a plurality of communication standards, and
the processor changes the response time according to one of the plurality of communication standards to which the noncontact communication medium conforms.

5. The noncontact communication medium according to claim 1, wherein:
the communicatee is any of a plurality of communication devices,
the plurality of communication devices has any of a plurality of communication standards, and
the processor changes the response time according to one of the plurality of communication standards used by the communicatee.

6. The noncontact communication medium according to claim 1, further comprising:
a power generator that generates power with application of the external magnetic field to the coil, wherein:
the processor operates with the power, and
the processor makes the response time longer than a first predetermined time according to the characteristic.

7. The noncontact communication medium according to claim 6, wherein the processor makes the response time longer than the first predetermined time, by making a processing time required from a start of the processing to an end of the processing longer than a second predetermined time.

8. The noncontact communication medium according to claim 7, further comprising:
a clock signal generator that generates a clock signal using the power, wherein:
the processor executes the processing at a processing speed corresponding to a frequency of the clock signal, and
the processor maintains the frequency regardless of the processing time, or lowers the frequency as the processing time is made longer.

9. The noncontact communication medium according to claim 1, wherein the command is one command.

10. The noncontact communication medium according to claim 1, wherein the coil transmits a processing result of the processing executed by the processor through the external magnetic field.

11. The noncontact communication medium according to claim 1, wherein the processor further changes the response time according to intensity of the external magnetic field.

12. The noncontact communication medium according to claim 11, wherein in a case of changing the response time according to the intensity of the external magnetic field, the processor makes the response time longer on a condition that the intensity of the external magnetic field falls below a threshold value.

13. The noncontact communication medium according to claim 1, wherein the processor changes the response time according to a type of the command.

14. The noncontact communication medium according to claim 13, further comprising:
a second memory storing second information, wherein:
the command is a polling command, a read-out command, or a write-in command,
the processor executes polling processing according to the polling command,
the processor executes read-out processing relating to the second information on the second memory according to the read-out command,
the processor executes write-in processing relating to the second information on the second memory according to the write-in command, and
the processor makes a time required for at least the read-out processing out of the write-in processing and the read-out processing longer than a time required for the polling processing.

15. A magnetic tape cartridge comprising:
the noncontact communication medium according to claim 1; and
a magnetic tape, wherein:
the noncontact communication medium has a third memory, and
the third memory stores information relating to the magnetic tape.

16. An operation method of a noncontact communication medium including a coil and a processor mounted on a magnetic tape cartridge, the processor communicating with a communicatee by coupling between the coil and the communicatee by electromagnetic induction through an external magnetic field applied from the communicatee, the communicatee merging a command into the external magnetic field, the processor executing processing corresponding to the command merged into the external magnetic field, the operation method comprising:
changing a response time of the processor in response to the command, according to a characteristic of at least one of the magnetic tape cartridge, the noncontact communication medium, or the communicatee.

17. A non-transitory storage medium storing a program that causes a computer applied to a noncontact communication medium including a coil and a processor mounted on a magnetic tape cartridge, the processor communicating with a communicatee by coupling between the coil and the communicatee by electromagnetic induction through an external magnetic field applied from the communicatee, the communicatee merging a command into the external magnetic field, the processor executing processing corresponding to the command merged into the external magnetic field, to execute processing comprising:
changing a response time of the processor in response to the command, according to a characteristic of at least one of the magnetic tape cartridge, the noncontact communication medium, or the communicatee.

* * * * *